(12) United States Patent
Uchiyama et al.

(10) Patent No.: US 7,801,352 B2
(45) Date of Patent: Sep. 21, 2010

(54) IMAGE ACQUIRING APPARATUS, IMAGE ACQUIRING METHOD, AND IMAGE ACQUIRING PROGRAM

(75) Inventors: Shigeru Uchiyama, Hamamatsu (JP); Takayuki Inoue, Hamamatsu (JP); Masatoshi Okugawa, Hamamatsu (JP); Jeremy Cooke, Welwyn Garden City (GB)

(73) Assignee: Hamamatsu Photonics K.K., Kamamatsu-shi, Shizuoka (JP)

( * ) Notice: Subject to any disclaimer, the term of this patent is extended or adjusted under 35 U.S.C. 154(b) by 813 days.

(21) Appl. No.: 11/477,822

(22) Filed: Jun. 30, 2006

(65) Prior Publication Data
US 2007/0206097 A1 Sep. 6, 2007

(30) Foreign Application Priority Data
Mar. 1, 2006 (JP) ............................ P2006-055547

(51) Int. Cl.
*G06K 9/00* (2006.01)
(52) U.S. Cl. ....................................... 382/133; 382/257
(58) Field of Classification Search ................. 382/133, 382/257
See application file for complete search history.

(56) References Cited

U.S. PATENT DOCUMENTS

| | | | |
|---|---|---|---|
| 6,272,235 B1 | 8/2001 | Bacus et al. | |
| 6,396,941 B1 | 5/2002 | Bacus et al. | |
| 6,522,774 B1 | 2/2003 | Bacus et al. | |
| 6,674,881 B2 | 1/2004 | Bacus et al. | |
| 6,674,884 B2 | 1/2004 | Bacus et al. | |
| 6,711,283 B1 | 3/2004 | Soenksen | |
| 6,816,606 B2 | 11/2004 | Feineigle et al. | |
| 6,847,729 B1 | 1/2005 | Clinch et al. | |
| 6,917,696 B2 | 7/2005 | Soenksen | |
| 2002/0090127 A1* | 7/2002 | Wetzel et al. | 382/133 |
| 2003/0228038 A1* | 12/2003 | Douglass et al. | 382/128 |
| 2004/0047033 A1 | 3/2004 | Nakagawa | |
| 2004/0184678 A1 | 9/2004 | Maddison | |
| 2004/0252875 A1 | 12/2004 | Crandall et al. | |
| 2005/0089208 A1 | 4/2005 | Dong et al. | |
| 2006/0038144 A1 | 2/2006 | Maddison | |
| 2006/0050948 A1* | 3/2006 | Sumida et al. | 382/133 |

FOREIGN PATENT DOCUMENTS

| | | |
|---|---|---|
| WO | 96/10196 | 4/1996 |
| WO | 03/012518 | 2/2003 |

\* cited by examiner

*Primary Examiner*—Vikkram Bali
*Assistant Examiner*—Katrina Fujita
(74) *Attorney, Agent, or Firm*—Drinker Biddle & Reath LLP

(57) ABSTRACT

In acquisition of a micro image of a sample S by a micro image acquiring unit, when a plurality of image acquiring ranges are set for the sample S as an object of image acquisition, a plurality of corresponding focus information are set, and furthermore, when a plurality of partial images acquired by scanning the sample S by the micro image acquiring unit include a partial image including mixing of a plurality of image acquiring ranges, the focus information is switched in the middle of scanning of the partial image. With such a structure, even when a plurality of objects are contained in the sample S, images of the respective objects can be preferably acquired. Thereby, an image acquiring apparatus, an image acquiring method, and an image acquiring program which are capable of preferably acquiring images of a plurality of objects are realized even when the plurality of objects are contained in a sample S.

10 Claims, 13 Drawing Sheets

Fig.3
(a)
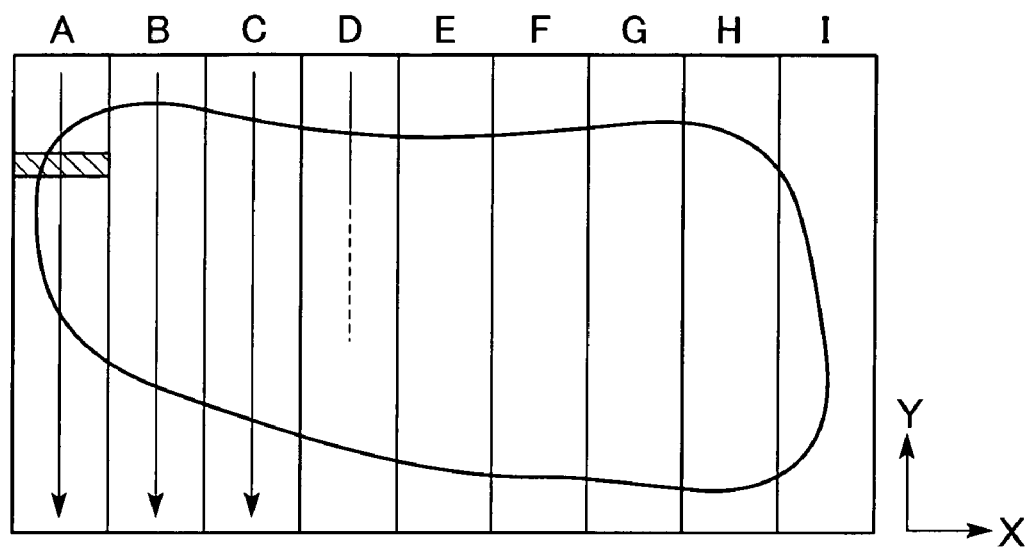
(b)
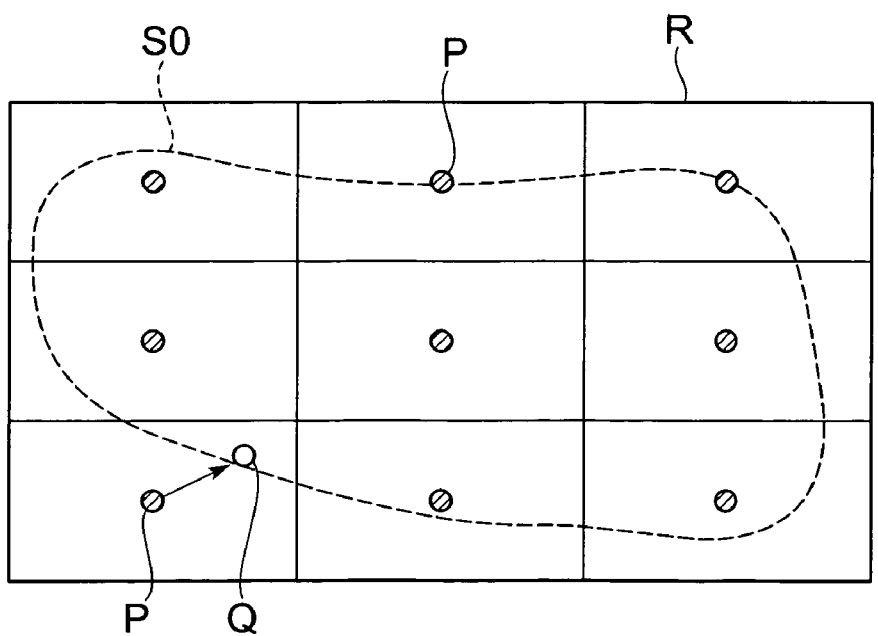

Fig.12
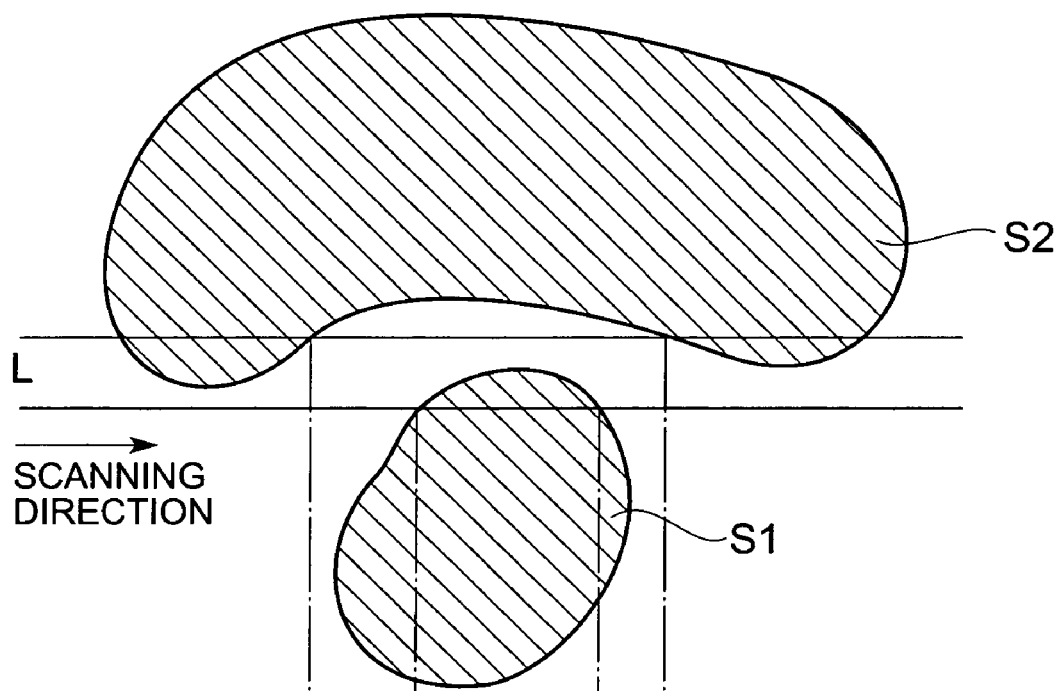
(a)
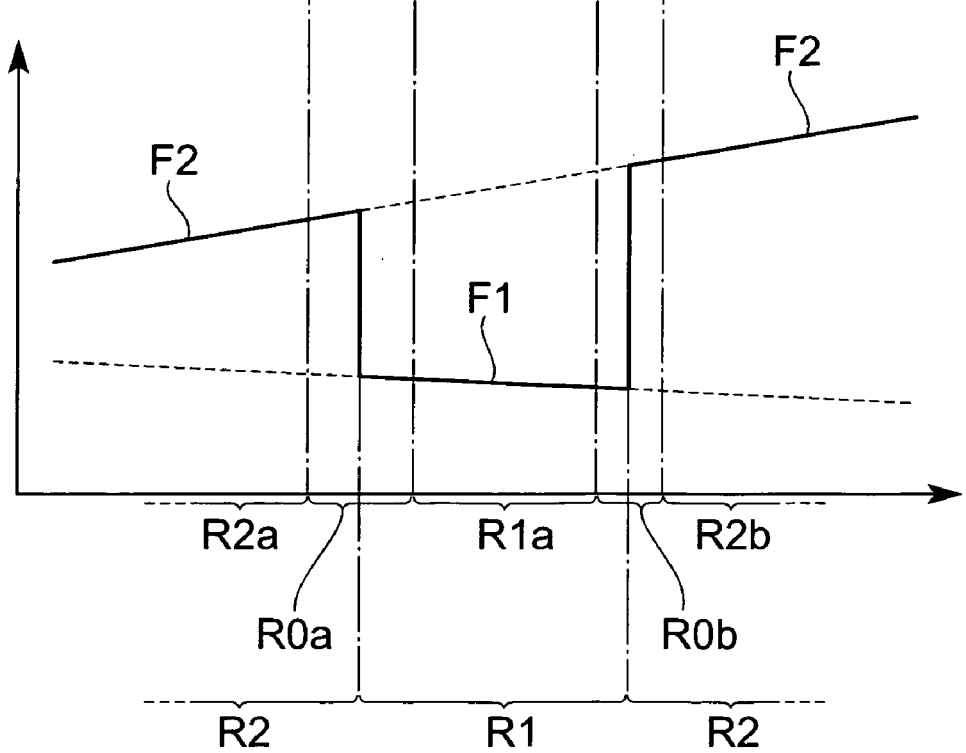
(b)

IMAGE ACQUIRING APPARATUS, IMAGE ACQUIRING METHOD, AND IMAGE ACQUIRING PROGRAM

BACKGROUND OF THE INVENTION

1. Field of the Invention

The present invention relates to an image acquiring apparatus, an image acquiring method, and an image acquiring program for acquiring images of a sample.

2. Related Background Art

Recently, in the field of pathology, etc., there are known virtual microscopes which can be operated as if an operator operates a sample through a real microscope in a virtual space of a personal computer or the like. Sample data to be handled in such a virtual microscope is based on image data of a sample acquired in advance by using a real microscope at high resolution.

For realizing image operation in the virtual microscope, it is demanded that an image acquiring apparatus which acquires image data of a sample to be thus used in a virtual microscope acquires an image of a sample at sufficiently high resolution. In addition, setting of focus information for acquiring such an image with high resolution is described in, for example, Document 1: U.S. Pat. No. 6,816,606.

SUMMARY OF THE INVENTION

In acquisition of image data of a sample to be used in a virtual microscope, a slide containing a biological sample, etc., sealed in a slide glass is an object of the image acquisition. In image acquisition processing using such a slide as a sample, focus information such as a focus map is set as an image pickup condition to be referred to when acquiring an image of the biological sample of the object of image acquisition, and image acquisition of the object is performed while performing focus control based on the focus information.

On the other hand, in image acquisition targeting a predetermined object contained in a sample, such as a biological sample sealed in the slide, a plurality of objects such as a plurality of biological samples may be contained in the sample. In such a case, to acquire images of the respective objects, the image acquiring operation becomes complicated such as a plurality of times of image acquisition processing for the same sample.

The present invention has been made in order to solve this problem, and an object thereof is to provide an image acquiring apparatus, an image acquiring method, and an image acquiring program by which, even when a plurality of objects are contained in a sample, images of the respective objects can be preferably acquired.

In order to achieve such an object, an image acquiring apparatus of the present invention includes (1) micro image acquiring means for acquiring a micro image of a sample by scanning the sample at a predetermined resolution, image pickup condition setting means for setting, for the sample, an image acquiring range corresponding to a range including an object of image acquisition and focus information concerning the image acquisition of the object in the image acquiring range and micro image acquisition control means for controlling an operation for acquiring the micro image of the micro image acquiring means, (2) the micro image acquiring means has an image pickup device capable of acquiring a one-dimensional image or a two-dimensional image and sets one direction on an image pickup plane in the image pickup device as a scanning direction for acquiring the micro image, (3) the micro image acquisition control means performs control so that a partial image is acquired by scanning the sample in the scanning direction by the image pickup device and a plurality of partial images that become the micro image are acquired by repeating this partial image acquisition a plurality of times while changing an image pickup position along another direction of the image pickup plane, and (4) when at least a first image acquiring range and a second image acquiring range are set as the image acquiring range, the image pickup condition setting means sets corresponding first focus information and second focus information as the focus information, and when a partial image among the plurality of partial images includes mixing of a first region belonging to the first image acquiring range and a second region belonging to the second image acquiring range, the focus information is switched between the first focus information and the second focus information in the respective first region and second region to perform scanning of the sample for acquiring the partial image.

Also, an image acquiring method of the present invention includes (1) a micro image acquiring step for acquiring a micro image of a sample by scanning the sample at a predetermined resolution, an image pickup condition setting means for setting, for the sample, an image acquiring range corresponding to a range including an object of image acquisition and focus information concerning the image acquisition of the object in the image acquiring range; and a micro image acquisition control step for controlling an operation for acquiring the micro image at the micro image acquiring step, (2) the micro image acquiring step uses an image pickup device capable of acquiring a one-dimensional image or a two-dimensional image and sets one direction on an image pickup plane in the image pickup device as a scanning direction for acquiring the micro image, (3) the micro image acquisition control step performs control for acquiring a partial image by scanning the sample in the scanning direction by the image pickup device and acquiring a plurality of partial images that become the micro image by repeating this partial image acquisition a plurality of times while changing an image pickup position along another direction of the image pickup plane, and (4) when at least a first image acquiring range and a second image acquiring range are set as the image acquiring range, the image pickup condition setting step sets corresponding first focus information and second focus information as the focus information, and when a partial image among the plurality of partial images includes mixing of a first region belonging to the first image acquiring range and a second region belonging to the second image acquiring range, the focus information is switched between the first focus information and the second focus information in the respective first region and second region to perform scanning of the sample for acquiring the partial image.

Also, an image acquiring program of the present invention is (1) applied to an image acquiring apparatus including micro image acquiring means for acquiring a micro image of a sample by scanning the sample at a predetermined resolution, and makes a computer execute, image pickup condition setting processing for setting, for the sample, an image acquiring range corresponding to a range including an object of image acquisition, and focus information concerning the image acquisition of the object in the image acquiring range, micro image acquisition control processing for controlling an operation for acquiring the micro image of the micro image acquiring means, (2) the micro image acquiring means has an image pickup device capable of acquiring a one-dimensional image or a two-dimensional image and sets one direction on an image pickup plane in the image pickup device as a scanning direction for acquiring the micro image, (3) the micro image acquisition control processing performs control so that a partial image is acquired by scanning the sample in the scanning direction by the image pickup device, and a plurality of partial images that become the micro image are acquired by repeating this partial image acquisition a plurality of times while changing an image pickup position along another direction of the image pickup plane, (4) when at least a first image acquiring range and a second image acquiring range are set as the image acquiring range, the image pickup condition setting processing sets corresponding first focus information and second focus information as the focus information, and when a partial image among the plurality of partial images includes mixing of a first region belonging to the first image acquiring range and a second region belonging to the second image acquiring range, the focus information is switched between the first focus information and the second focus information in the respective first region and second region to perform scanning of the sample for acquiring the partial image.

In the above-described image acquiring apparatus, image acquiring method, and image acquiring program, concerning an object of image acquisition contained in a sample, an image acquiring range, and focus information such as a focus map to be referred to when acquiring an image are set as image pickup conditions. In this structure, when a plurality of image acquiring ranges are set for the sample as in the case of a plurality of objects contained in the sample, focus information is obtained for each image acquiring range. Thereby, focus control for the entire sample including the plurality of image acquiring ranges can be preferably performed.

In a case where a plurality of image acquiring ranges are set and a plurality of corresponding focus information (for example, a plurality of focus maps) are set for a sample, when a plurality of partial images acquired by scanning the sample include a partial image including mixing of a plurality of image acquiring ranges, focus information is switched in the middle of scanning of this partial image. In such a structure, images of the respective objects can be acquired by one image acquisition processing while preferably performing focus control. Thereby, even when a plurality of objects are contained in a sample, images of the respective objects can be preferably acquired. In addition, an image acquiring operation necessary for such a sample including the plurality of objects is simplified.

Another image acquiring apparatus of the present invention includes (1) macro image acquiring means for acquiring a macro image of a sample, and image pickup condition setting means for setting an image acquiring range corresponding to a range including an object of image acquisition and focus information concerning image acquisition of the object in the image acquiring range as image pickup conditions of a micro image of the sample by referring to the macro image, (2) the image pickup condition setting means assumes, as a method for acquiring the micro image, a method in which micro image acquiring means that includes an image pickup device capable of acquiring a one-dimensional image or a two-dimensional image and is structured so as to use one direction on an image pickup plane in the image pickup device as a scanning direction for acquiring a micro image, is used to acquire a partial image by scanning the sample in the scanning direction by the image pickup device and this partial image acquisition is repeated a plurality of times while changing the image pickup position along another direction of the image pickup plane to acquire a plurality of partial images to become a micro image, and (3) when at least a first image acquiring range and a second image acquiring range are set as the image acquiring range, the image pickup condition setting means sets corresponding first focus information and second focus information as the focus information, and when a partial image of the plurality of partial images include mixing of a first region belonging to the first image acquiring range and a second region belonging to the second image acquiring range, the image pickup conditions are set so as to scan the sample to acquire the partial image by switching the focus information between the first focus information and the second focus information in the respective first region and second region.

In addition, an image acquiring method according to the present invention includes (1) a macro image acquiring step for acquiring a macro image of a sample, and an image pickup condition setting step for setting an image acquiring range corresponding to a range including an object of image acquisition and focus information concerning the image acquisition of the object in the image acquiring range as image pickup conditions of a micro image of the sample by referring to the macro image, (2) at the image pickup condition setting step, as a method for acquiring the micro image, a method is assumed in which micro image acquiring means that includes an image pickup device capable of acquiring a one-dimensional image or a two-dimensional image and is structured so as to use one direction on an image pickup plane in the image pickup device as a scanning direction for acquiring a micro image, is used to acquire a partial image by scanning the sample in the scanning direction by the image pickup device and this partial image acquisition is repeated a plurality of times while changing the image pickup position along another direction of the image pickup plane to acquire a plurality of partial images to become a micro image, and (3) when at least a first image acquiring range and a second image acquiring range are set as the image acquiring range, the image pickup condition setting means sets corresponding first focus information and second focus information as the focus information, and when a partial image among the plurality of partial images includes mixing of a first region belonging to the first image acquiring range and a second region belonging to the second image acquiring range, the image pickup conditions are set so as to scan the sample to acquire the partial image by switching the focus information between the first focus information and the second focus information in the respective first region and second region.

Also, an image acquiring program of the present invention is (1) applied to an image acquiring apparatus including macro image acquiring means for acquiring a macro image of a sample, and makes a computer execute, image pickup condition setting processing for setting an image acquiring range corresponding to a range including an object of image acquisition and focus information concerning the image acquisition of the object in the image acquiring range as image pickup conditions of a micro image of the sample by referring to the macro image, (2) the image pickup condition setting processing assumes, as a method for acquiring the micro image, a method in which micro image acquiring means that has an image pickup device capable of acquiring a one-dimensional image or a two-dimensional image and sets one direction on an image pickup plane in the image pickup device as a scanning direction for acquiring the micro image, is used to acquire a partial image by scanning the sample in the scanning direction by the image pickup device, and a plurality of partial images that become the micro image are acquired by repeating this partial image acquisition a plurality of times while changing an image pickup position along another direction of the image pickup plane, and (3) when at least a first image acquiring range and a second image acquiring range are set as the image acquiring range, the image pickup condition setting processing sets corresponding first focus information and second focus information as the focus information, and when a partial image among the plurality of partial images includes mixing of a first region belonging to the first image acquiring range and a second region belonging to the second image acquiring range, the image pickup conditions are set so that scanning of the sample for acquiring the partial image is performed by switching the focus information between the first focus information and the second focus information in the respective first region and second region.

In the above-described image acquiring apparatus, image acquiring method, and image acquiring program, as for an object of image acquisition contained in a sample, an image acquiring range and focus information such as a focus map to be referred to for image acquisition are set as image pickup conditions of a micro image by referring to the macro image of the sample. In such a structure, when a plurality of image acquiring ranges are set for a sample as in the case of a plurality of objects contained in a sample, focus information is obtained for each image acquiring range. Thereby, focus control for the whole sample including the plurality of image acquiring ranges can be preferably performed.

In the case where a plurality of image acquiring ranges and a plurality of corresponding focus information (for example, a plurality of focus maps) are set for a sample, when a plurality of partial images acquired by scanning the sample include a partial image including mixing of a plurality of image acquiring ranges, image pickup conditions are set so that the focus information is switched in the middle of scanning of this partial image. In such a structure, images of the plurality of objects can be acquired by one image acquisition processing while preferably performing focus control. Thereby, even when a plurality of objects are contained in a sample, images of the respective objects can be preferably acquired. In addition, an image acquiring operation necessary for such a sample containing a plurality of objects is simplified.

According to the image acquiring apparatus, image acquiring method, and image acquiring program of the present invention, in a case where a plurality of image acquiring ranges and a plurality of corresponding focus information are set for a sample as an object of image acquisition, when a plurality of partial images acquired by scanning the sample include a partial image including mixing of a plurality of image acquiring ranges, by switching the focus information in the middle of scanning of this partial image, even when a plurality of objects are contained in a sample, images of the respective objects can be preferably acquired.

BRIEF DESCRIPTION OF THE DRAWINGS

FIG. 3 is a figure with drawings schematically showing a sample image acquiring method.

FIG. 12 is a graph showing an example of a sample scanning method for acquiring a partial image.

DESCRIPTION OF THE PREFERRED EMBODIMENTS

Figure 1:
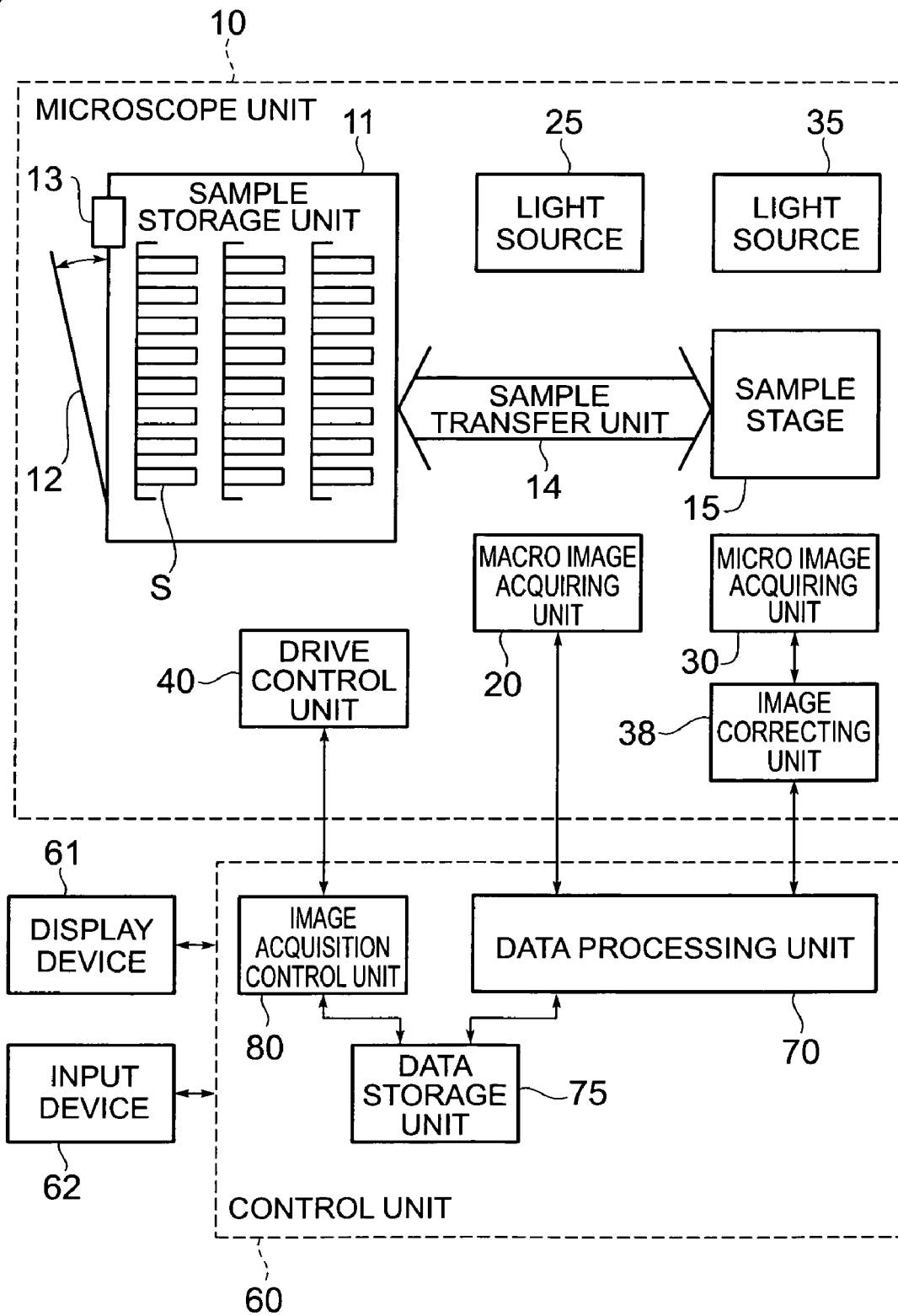
FIG. 1 is a block diagram showing a structure of an embodiment of an image acquiring apparatus.

Hereinafter, preferred embodiments of an image acquiring apparatus, an image acquiring method, and an image acquiring program of the present invention will be described along with the drawings. In the description of the drawings, the same components are attached with the same reference numerals, and overlapping description will be omitted. The dimensional ratios of the drawings are not always the same as those in the description.

First, an entire structure of an image acquiring apparatus will be described. FIG. 1 is a block diagram showing a structure of an embodiment of an image acquiring apparatus according to the present invention. The image acquiring apparatus according to this embodiment is a microscope system used to acquire images of a sample S with high resolution, and is made up of a microscope unit 10 used to acquire images of the sample S and a control unit 60 that controls the microscope unit 10 acquiring the images. A slide (preparation) in which a biological sample, such as a tissue slice, is enclosed in a slide glass when image data to be used in a virtual microscope is acquired can be mentioned as an example of the sample S serving as an object of image acquisition.

The microscope unit 10 includes a sample storage unit 11, a macro image acquiring unit 20, and a micro image acquiring unit 30. The sample storage unit 11 is a storage means structured so as to store a plurality of samples (for example, a plurality of slides containing biological samples sealed, respectively) S as objects of image acquisition. In this embodiment, by providing such sample storage unit 11, it becomes possible to perform image acquisition processing for a plurality of samples S. In this sample storage unit 11, a door 12 to be used by an operator to store and extract a sample S is provided. In this embodiment, an interlock mechanism 13 for preventing the door 12 from being opened by mistake during image acquisition is attached.

The macro image acquiring unit 20 is first image acquiring means for acquiring a macro image as a low-magnification image of a sample S. This image acquiring unit 20 acquires a macro image at low resolution corresponding to a whole image of a sample S. A macro light source 25 is provided to supply light, which is used to produce an optical image of the sample S when macro images are acquired, for the macro image acquiring unit 20. The macro image acquiring unit 20 and the macro light source 25 are provided as necessary.

On the other hand, the micro image acquiring unit 30 is second image acquiring means for acquiring a micro image as a high-magnification image of a sample S. In this image acquiring unit 30, a micro image with high resolution of the target sample S is acquired by two-dimensionally scanning the sample S at a predetermined resolution. A micro light source 35 is provided to supply light, which is used to produce an optical image of the sample S when micro images are acquired, for the micro image acquiring unit 30.

Additionally, in a structure shown in FIG. 1, an image correcting unit 38 is disposed to make necessary corrections to image data concerning micro images acquired by the image acquiring unit 30. A dark correction, a shading correction, etc., can be mentioned as corrections performed by the image correcting unit 38. For example, a shading correction can be performed in such a way that a blank image obtained by imaging a reference sample, such as a slide on which no biological sample is placed, is pre-acquired, and then a shading correction is performed while referring to this blank image. Macro images may be corrected in the same way.

As sample moving means for moving a sample S among positions in the microscope unit 10, a sample transfer unit 14 and a sample stage 15 are provided. The sample transfer unit 14 is transferring means for transferring a sample S between a storage position in the sample storage unit 11 and each of the image acquiring positions for the macro image acquiring unit 20 and the micro image acquiring unit 30. The sample stage 15 carries a sample S placed thereon when acquiring a macro image or a micro image, and is used for setting and adjusting an image acquiring position of the sample S. The microscope unit 10 includes a drive control unit 40 that controllably drives each unit provided in the microscope unit 10.

The control unit 60 includes a data processing unit 70, a data storage unit 75, and an image acquisition control unit 80. Image data of macro images acquired by the macro image acquiring unit 20 and image data of micro images acquired by the micro image acquiring unit 30 are input into the data processing unit 70, and these image data undergo necessary data processing. In this data processing unit 70, setting of image pickup conditions for micro image acquisition is also performed.

The image acquisition control unit 80 controls an operation to acquire an image of the sample S in the microscope unit 10 via the drive control unit 40. Image data input into the data processing unit 70, various data and information obtained by image data processing, or pieces of control information used in the image acquisition control unit 80 are stored and kept in the data storage unit 75 according to need.

The control unit 60 is formed of a computer that includes, for example, a CPU and necessary storage devices, such as memories and hard disks. A display device 61 and an input device 62 are connected to the control unit 60. The display device 61 is, for example, a CRT display or a liquid crystal display, and is used to display an operation screen necessary to operate the image acquiring apparatus or to display an acquired image of the sample S. The input device 62 is, for example, a keyboard or a mouse, and is used to input information necessary for image acquisition or to input instructions for an image acquiring operation.

Figure 2:
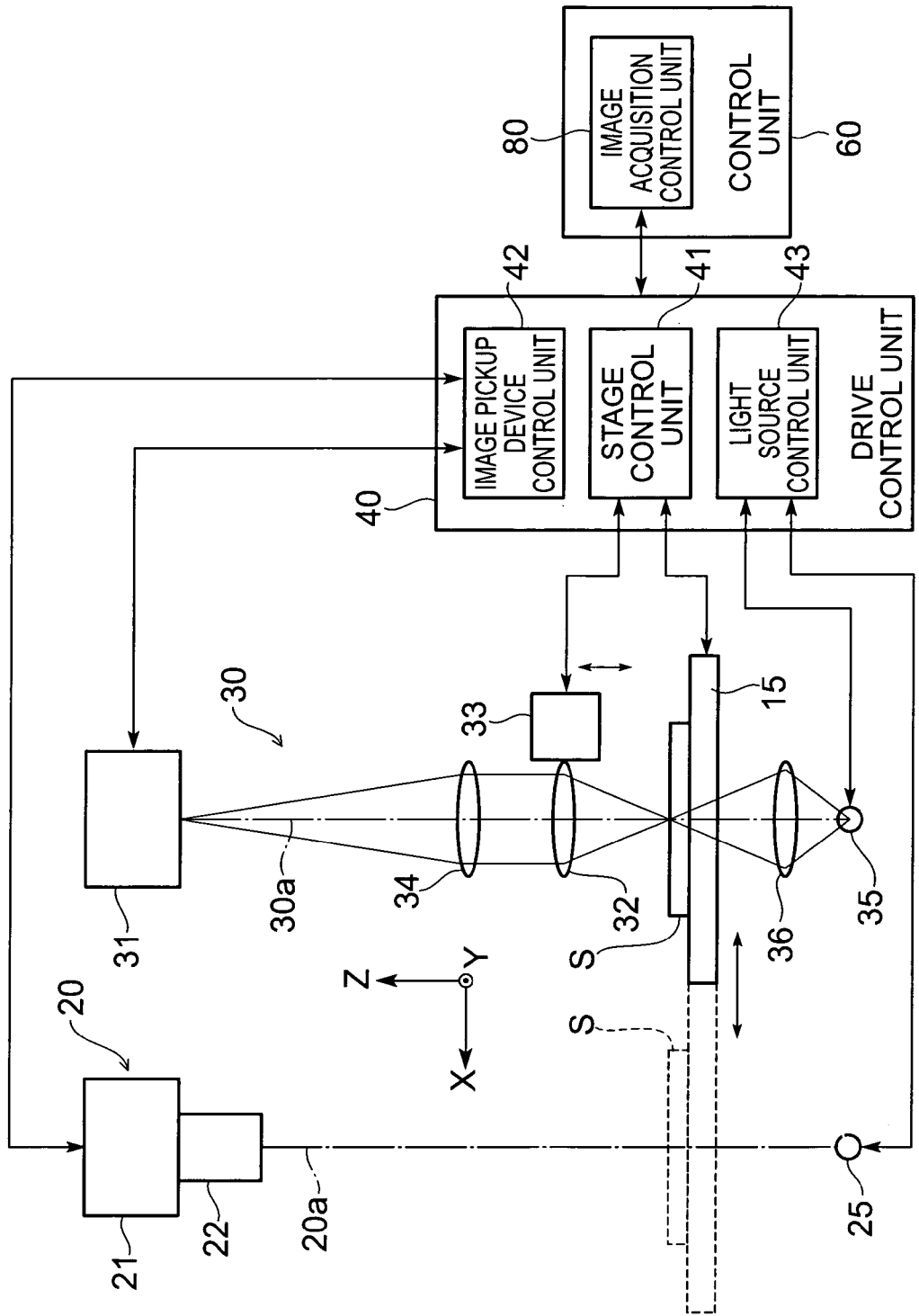
FIG. 2 is a drawing schematically showing a structure of a microscope unit in the image acquiring apparatus.

Next, a description will be given of a structure of the microscope unit 10 of the image acquiring apparatus shown in FIG. 1. FIG. 2 is a schematic view of the structure of the microscope unit 10. As shown in FIG. 2, the microscope unit 10 according to this embodiment is configured as a transmission type microscope system used to acquire an optical image of a sample S. Herein, two directions perpendicular to each other in a horizontal direction are defined as an X-axis direction and a Y-axis direction, respectively, and a vertical direction perpendicular to the horizontal direction is defined as a Z-axis direction, as shown in the figure. Among these directions, the Z-axis direction, i.e., the vertical direction is that of an optical axis for image acquisition in this microscope system. In FIG. 2, the structures of the macro image acquiring unit 20 and the micro image acquiring unit 30 are mainly shown, and the sample storage unit 11, the sample transfer unit 14, etc., are not shown.

The sample S is placed on the sample stage 15 at the time of image acquisition in the image acquiring unit 20 or 30. This sample stage 15 is structured as an XY stage movable in the X-axis direction and the Y-axis direction by using a stepping motor, a DC motor, or a servo motor. With this structure, by driving the sample stage 15 within the XY plane, the image acquiring position in the image acquiring unit 20 or 30 with respect to the sample S is set and adjusted. In this embodiment, this sample stage 15 is movable between an image acquiring position in the macro image acquiring unit 20 and an image acquiring position in the micro image acquiring unit 30.

The macro image acquiring unit 20 and the macro light source 25 are provided at respective predetermined positions on an optical axis 20a, with respect to the macro image acquiring position to acquire a macro image of the sample S. The macro light source 25 is a light source from which light used to produce an optical image for macro image acquisition is projected onto the sample S, and is disposed under the sample stage 15.

The macro image acquiring unit 20 is configured by using an image pickup device 21, such as a two-dimensional CCD sensor, that is capable of acquiring a two-dimensional image by the optical image of the sample S. An image pickup optical system 22 serving as an optical system that guides the optical image of the sample S is disposed between the macro image acquiring position at which the sample S is placed and the image pickup device 21.

On the other hand, the micro image acquiring unit 30 and the micro light source 35 are provided at respective predetermined positions on an optical axis 30a, with respect to the micro image acquiring position to acquire a micro image of the sample S. The micro light source 35 is a light source from which light used to produce an optical image for micro image acquisition is projected onto the sample S, and is, together with a condensing lens 36, disposed under the sample stage 15.

The micro image acquiring unit 30 is configured by using an image pickup device 31, such as a one-dimensional CCD sensor, that is capable of acquiring a one-dimensional image by the optical image of the sample S. An objective lens 32 and a light guide optical system 34, serving as an optical system that guides the optical image of the sample S, are disposed between the micro image acquiring position at which the sample S is placed and the image pickup device 31. The objective lens 32 produces an optical image of the sample S by entering light that has been transmitted through the sample S thereinto. The light guide optical system 34 is formed of, for example, a tube lens, and guides the optical image of the sample S to the image pickup device 31.

With respect to the objective lens 32, a Z stage 33 using a stepping motor or a piezo-actuator is provided, and by driving the objective lens 32 in the Z-axis direction by this Z stage 33, focusing on the sample S can be performed. As the image pickup device 31 in this micro image acquiring unit 30, for example, an image pickup device capable of acquiring a two-dimensional image and TDI driving can also be used as well as the image pickup device capable of acquiring a one-dimensional image. Generally, as the image pickup device 31, an image pickup device capable of acquiring a one-dimensional image or a two-dimensional image is properly selected and used according to the detailed structure, etc., of the image acquiring apparatus.

As this micro image acquiring image pickup device 31, for example, an image pickup device such as a 3-CCD camera capable of acquiring a color image is preferably used. As the macro image acquiring image pickup device 21, either a monochrome image acquiring image pickup device or an image pickup device capable of acquiring a color image can be used as appropriate. As the image pickup device 31, when acquisition of a color image is not necessary, a monochrome image acquiring image pickup-device can also be used.

The drive control unit 40 includes a stage control unit 41, an image pickup device control unit 42, and a light source control unit 43 which are provided for the sample stage 15, the macro image acquiring unit 20, the micro image acquiring unit 30, the light sources 25 and 35. The stage control unit 41 controllably drives the sample stage 15, which is an XY stage, and a Z stage 33 so as to set and adjust image pickup conditions concerning the sample S. The image pickup device control unit 42 controllably drives the image pickup devices 21 and 31 so as to control the image acquisition of the sample S. The light source control unit 43 controllably drives the light sources 25 and 35 so as to control the projection of light used for the image acquisition of the sample S. Concerning the control of each unit of the microscope unit 10, another structure may be formed so that each unit is controlled directly by the image acquisition control unit 80 of the control unit 60 without using the drive control unit 40.

Herein, acquisition of the macro image and the micro image of the sample S in the image acquiring units 20 and 30 will be described. In the macro image acquiring unit 20, a macro image as a whole image of the sample S to be used for setting image pickup conditions of a micro image is acquired. For example, if a slide in which a biological sample or the like is enclosed in a slide glass as mentioned above is used as the sample S, an image of the whole of the slide or an image of a predetermined range in the slide including the biological sample of the object of image acquisition is acquired as the macro image.

In the micro image acquiring unit 30, a micro image of the sample S at target resolution is acquired with reference to the set image pickup condition. This micro image acquisition is performed by two-dimensionally scanning the sample S at a predetermined resolution higher than that of the macro image as schematically shown in FIG. 3(a). Herein, in the micro image acquisition using the image pickup device 31 such as a one-dimensional CCD camera, in an XY plane parallel to the sample S, the longitudinal direction of an image pickup plane of the image pickup device 31 is defined as an X-axis direction, and a direction orthogonal to this longitudinal direction is defined as a Y-axis direction. In this case, in the micro image acquisition, the direction orthogonal to the longitudinal direction of the image pickup plane in the image pickup device 31, that is, the negative direction of the Y axis in FIG. 3(a) is the direction to scan the sample S.

In the micro image acquisition using the image pickup device 31 such as a one-dimensional CCD camera, first, the sample S on the sample stage 15 is scanned in the scanning direction (negative direction of the Y axis) by the image pickup device 31 to acquire a strip-like partial image A with the desired resolution. Furthermore, as shown in FIG. 3(a), a plurality of partial images A, B, . . . , I are acquired by repeating a plurality of times this partial image acquisition while changing the image pickup position along the longitudinal direction (positive direction of the X axis) of the image pickup plane.

By arranging the thus obtained partial images A through I in the X axis direction and combining these, a micro image of the entire sample S (for example, a digital slide in a virtual microscope) can be generated. By such a micro image acquiring method, it is possible to preferably acquire image data of the sample S at sufficiently high resolution. In FIG. 3(a), the hatched region in the partial image A, whose longitudinal direction is along the X-axis direction, shows an image pickup region corresponding to the image pickup plane in the image pickup device 31.

Generally, when the micro image acquiring unit 30 is configured by using an image pickup device capable of acquiring a one-dimensional image or a two-dimensional image, one direction on an image pickup plane in the image pickup device is used as a scanning direction for acquiring a micro image. Then, a partial image is acquired by scanning a sample in the scanning direction by the image pickup device, and by repeating this partial image acquisition a plurality of times while changing the image pickup position along another direction of the image pickup plane, a plurality of partial images to become a micro image can be acquired.

To set image pickup conditions of a micro image, it is preferable that an image acquiring range and focus measuring position are set as image pickup conditions of a micro image with reference to the macro image acquired by the image pickup device 21 of the macro image acquiring unit 20. As a result, from information obtained by a macro image that is the whole image of the sample S, it becomes possible to suitably set parameters used for micro image acquisition and to acquire sample image data being in an excellent state and having high resolution.

In detail, when a slide is set as a sample S as described above, as shown in FIG. 3(b), the image acquiring range with respect to the sample S can be set to a rectangular range R including a biological sample S0 in the slide as an object of image acquisition. Two-dimensional scanning of the sample S in the micro image acquiring unit 30 (see FIG. 3(a)) is performed within the image acquiring range R thus set. When the image acquiring range R is automatically set, for example, it is possible to employ a method in which a range in which an object (for example, a biological sample S0) whose image is acquired exists is determined by binarizing an image with reference to a threshold that has been set with respect to the brightness pattern in a macro image, and, based on a determination result, the image acquiring range R is set.

Figure 4:
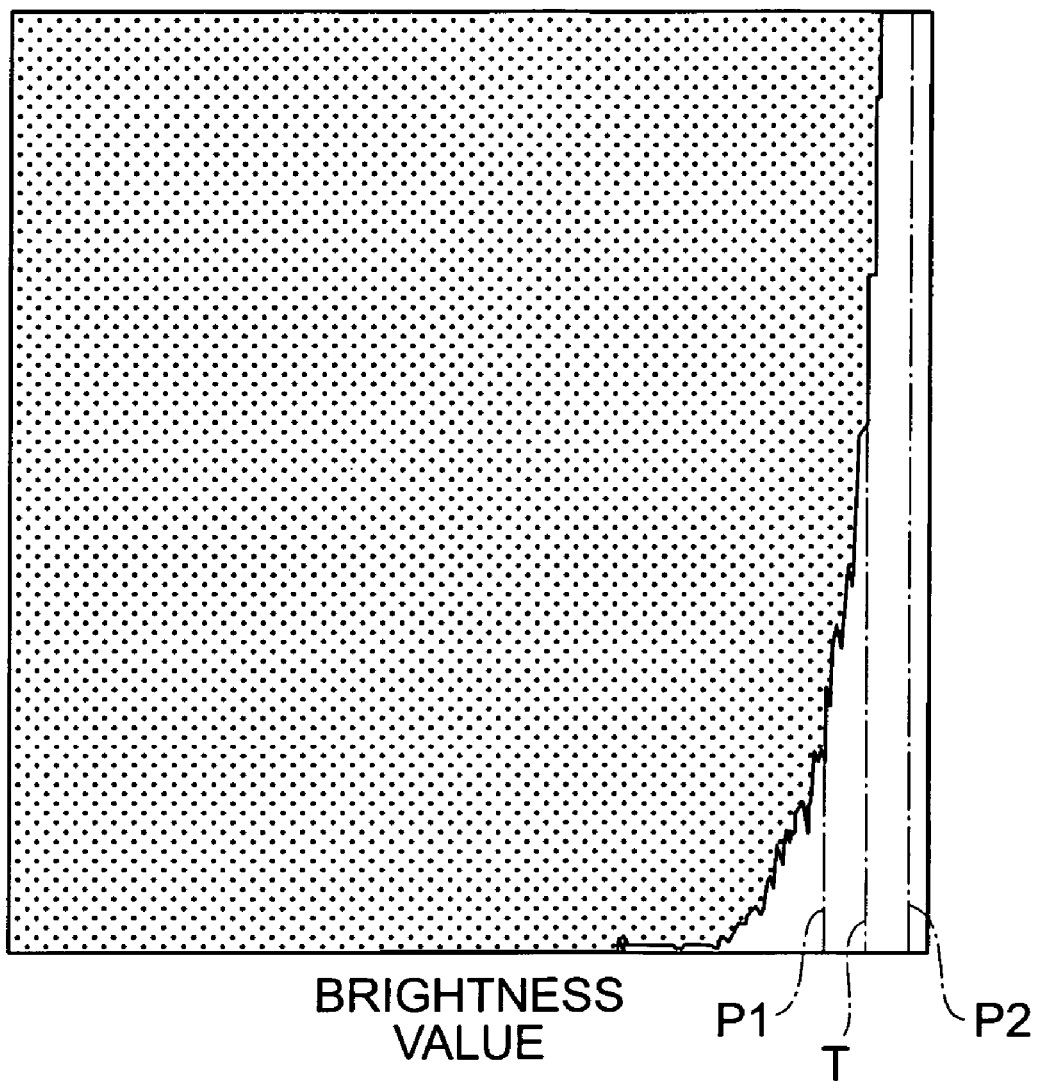
FIG. 4 is a graph showing a threshold setting method for binarization of a macro image.

FIG. 4 is a graph showing a method for setting a threshold to binarize a macro image. In the graph of FIG. 4, the abscissa axis represents the brightness value in each pixel of a macro image. In the macro image acquired in this embodiment, a region in which only a slide glass is provided without a biological sample S0 has the highest brightness resulting from the optically transmissible structure of the macro image acquiring unit 20.

To set a threshold with respect to a macro image, for example, it is possible to employ a method in which two peaks P1 and P2 are found in its brightness distribution as shown in FIG. 4, and a brightness value at the center therebetween is set as a threshold T. Accordingly, ranges in which objects S0 exist in the image can be easily determined by binarizing the image according to this threshold. Further, a consecutive range greater than a specified area of the determined ranges is set as a range for one object S0, and a minimum, rectangular region containing all of the objects S0 is set as an image acquiring range R. To set such a threshold, various methods can be employed instead of the above method, for example, a threshold may be set at a predetermined, fixed rate with respect to a brightness value of a peak.

In discrimination of a range including the presence of the object S0 in the binarized macro image, it is preferable that erosion processing (processing for reducing the mass of a picture) is performed n times and dilation processing (processing for enlarging the mass of a picture) is performed n times to the image of the object in the binarized image. As a result, for example, small noises other than the image of the object in the image can be removed. It is permissible to further perform a filtering process to remove an edge of a cover glass of a slide or dust in the slide.

The focus measuring position is used, in the micro image acquiring unit 30, when acquiring focus information with respect to the sample S prior to acquisition of the micro image of the sample S. In the micro image acquiring unit 30, focus measurement is performed by using the image pickup device 31 at a set focus measuring position to determine a focus position as focus information on acquisition of the micro image of the sample S. Concerning the focus measuring position, for example, when the inclination of the sample S in a horizontal plane, i.e., a deviation in focal position in a horizontal plane is negligible, only one focus measuring position is set for the sample S.

When there is a need to consider a deviation in focal position in the horizontal plane, it is preferable to set three or more focus measuring positions for the sample S. A two-dimensional focus map with respect to the image acquiring range R of the sample S can be obtained by setting three or more focus measuring positions in this way and then performing focus measurement. For example, when the focus map about focal positions is determined as a planar focal plane, the focal plane can be calculated from a plane including measurement result points at the three focus measuring positions. When four or more focus measuring positions are used, a focal plane can be calculated from their measurement result points according to a fitting technique, such as a least-squares method.

FIG. 3(b) shows an example of setting of the focus measuring positions by using a macro image in the case where nine focus measuring positions are automatically set. In this case, the image acquiring range R set in advance for the sample S is equally divided by 3×3=9, and nine focus measuring positions P are set to center points of the respective divided regions.

In this case, eight points of the nine focus measuring positions are initially set points included in the range of the biological sample S0 as an object of image acquisition, so that they are set as focus measuring positions without change. On the other hand, the lower left point is out of the range of the biological sample S0, and it cannot be set as the focus measuring position as it is. Therefore, this lower left focus measuring position may be set to, for example, a position Q determined by a method in which it is moved toward the center of the image acquiring range R. Alternatively, such a position may be excluded from the focus measuring positions.

In the case of determining a focal plane by using the least square method from four or more focus measuring positions, when the focus measuring positions include a measuring position excessively distant from the obtained focal plane, it is preferable that a focal plane is re-determined by excluding this distant measuring position. When the focal plane cannot be normally determined, it is preferable that the object is regarded as dust and excluded.

As in the example described above, when the sample S is a slide, as the image pickup conditions for acquiring a micro image, preferably, first, an image acquiring range R including a biological sample S0 and a predetermined number of focus measuring positions P are set as the image pickup conditions of a micro image by referring to a macro image acquired by the macro image acquiring unit 20. Thereafter, in the micro image acquiring unit 30, focus information concerning the focal position or the focal plane with respect to the sample S is acquired based on the focus measuring positions P, and the micro image of the sample S is then acquired based on the thus obtained focus information and the set image acquiring range R.

For setting the image acquiring range R and the focus measuring positions P by using the macro image of the sample S, in detail, various methods may be used as well as the example shown in FIG. 3(b). For example, FIG. 3(b) shows an example in which the focus measuring positions P are set automatically by using a predetermined setting algorithm, however, to manually set the focus measuring positions, focus measuring positions with an appropriate number and arrangement may be set after an operator confirms the macro image. An image pickup condition setting method for a micro image will be described further later.

Figure 5:
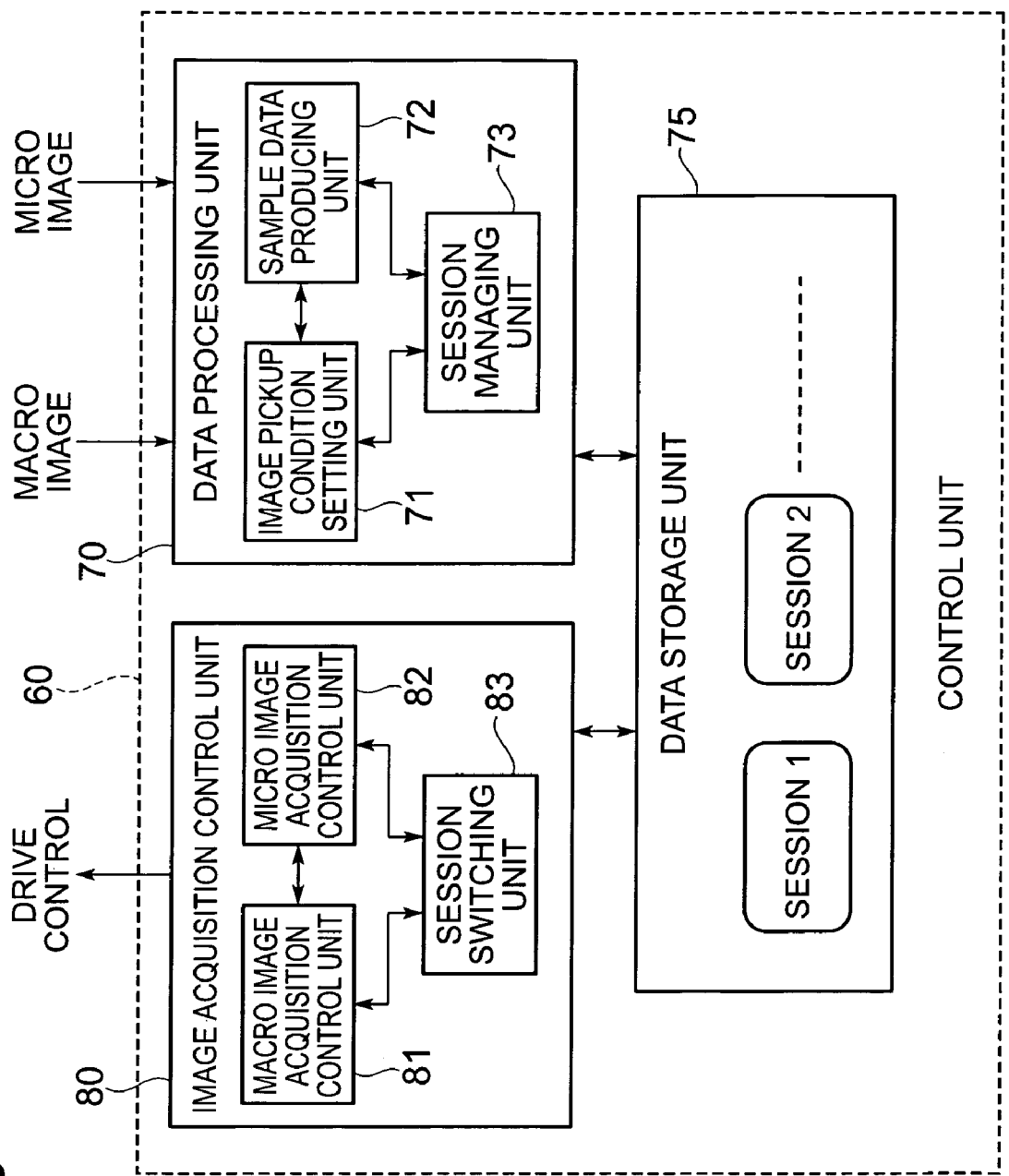
FIG. 5 is a block diagram showing a structure of a control unit in the image acquiring apparatus.

Next, a description will be given of a structure of the control unit 60 of the image acquiring apparatus shown in FIG. 1. FIG. 5 is a block diagram showing the structure of control unit 60. As shown in FIG. 5, the control unit 60 according to this embodiment is made up of the data processing unit 70, the data storage unit 75, and the image acquisition control unit 80.

The data processing unit 70 includes an image pickup condition setting unit 71 and a sample data producing unit 72. The image pickup condition setting unit 71 is setting means for setting an image acquiring range R corresponding to a range including the object S0 of image acquisition (a range including the entirety of an object or a part to be imaged) and focus information (for example, focus position, focal plane, focus map, etc.) concerning image acquisition of an object S0 in the image acquiring range R as image pickup conditions when acquiring a micro image of the sample S. The sample data producing unit 72 produces sample data as image data of the sample S by using a micro image acquired by the micro image acquiring unit 30.

Figure 6:
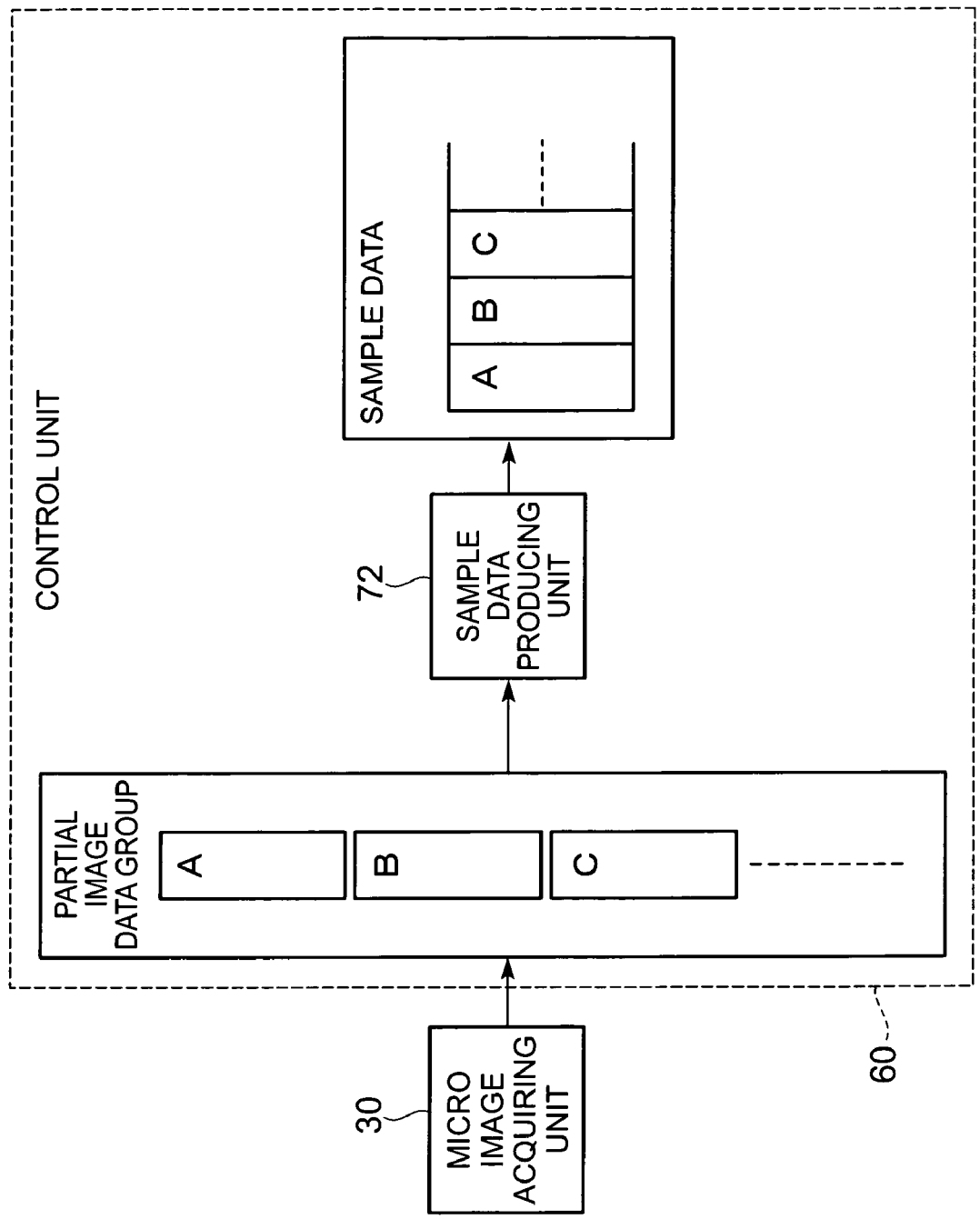
FIG. 6 is a drawing schematically showing production of sample data using a micro image.

FIG. 6 is a schematic view for explaining the production of sample data while using micro images. Herein, an image data group consisting of pieces of data concerning strip-like partial images A, B, C, . . . is input to the control unit 60 as image data of the micro images acquired by the micro image acquiring unit 30 of the microscope unit 10 (see FIG. 3(a)). The sample data producing unit 72 arranges and combines these partial images together, and produces image data of micro images with respect to the whole of the sample S so as to be sample data. For example, this sample data can be used as image data for the virtual microscope. The image data concerning the sample S may be subjected to data compression according to need. The image data input from the microscope unit 10 and the sample data produced by the sample data producing unit 72 are stored in the data storage unit 75 according to need.

The image acquisition control unit 80 includes a macro image acquisition control unit 81 and a micro image acquisition control unit 82. The macro image acquisition control unit 81 controls an operation to acquire macro images of the sample S by means of the macro image acquiring unit 20. The micro image acquisition control unit 82 controls an operation to acquire micro images by means of the micro image acquiring unit 30.

In addition, the image acquisition control units 81 and 82 control the acquiring operation of the macro and micro images of the sample S, and the image pickup condition setting unit 71 sets the image pickup conditions, according to a control mode selected for the image acquisition processing. In this embodiment, the number of control modes provided to the control unit 60 is three, i.e., a full-automatic mode, a manual mode, and a semi-automatic mode.

In the full-automatic mode, the macro image acquisition control unit 81 of the control unit 60 performs macro image acquisition control by placing the sample S from a storage position in the sample storage unit 11 at an image acquiring position for the macro image acquiring unit 20. The image pickup condition setting unit 71 automatically sets an image pickup condition for a micro image corresponding to the macro image, with respect to the sample S whose macro image has been acquired. The micro image acquisition control unit 82 performs micro image acquisition control by placing the sample S whose image pickup condition has been set at an image acquiring position for the micro image acquiring unit 30 while referring to the image pickup condition.

The manual mode is basically the same as the image acquiring procedures in the full-automatic mode except that the respective steps are manually performed in response to an instruction from an operator. However, even in the manual mode, a step which does not require an instruction from an operator may be automatically performed.

In the semi-automatic mode, the macro image acquisition control unit 81 of the control unit 60 places each of a plurality of samples S from the storage position in the sample storage unit 11 at an image acquiring position for the macro image acquiring unit 20 so as to acquire a macro image, and then performs control to place the sample S at a standby position. The image pickup condition setting unit 71 allows the operator to confirm the macro image and a corresponding image pickup condition, and sets an image pickup condition for a micro image, with respect to the sample S whose macro image has been acquired. The micro image acquisition control unit 82 places the sample S that has been placed at the standby position and for which the image pickup condition has been set at an image acquiring position for the micro image acquiring unit 30, and performs micro image acquisition control while referring to the image pickup condition. In this embodiment, the standby position of the sample S is set at the storage position in the sample storage unit 11.

In the image acquiring apparatus according to this embodiment, a session is defined in accordance with a plurality of samples S set in the sample storage unit 11 by the operator, and a sample group of samples S and a corresponding data group of macro images, image pickup conditions, micro images, etc., are associated with each other by this session. According to this structure, the control unit 60 shown in FIG. 5 includes a session managing unit 73 provided in the data processing unit 70 and a session switching unit 83 provided in the image acquisition control unit 80.

The session managing unit 73 manages the data group consisting of macro images, image pickup conditions, micro images, etc., in each session, and allows the data storage unit 75 to store the data group if necessary. In the data storage unit 75 of FIG. 5, as an example of the data management, a case is shown in which a data group of a plurality of sessions consisting of session 1, session 2, . . . is stored. The session switching unit 83 controls switching between an image acquisition processing and another image acquisition processing in association with an exchange for a sample group of a plurality of samples S, and gives instructions to the session managing unit 73 to perform switching to a corresponding data group. Thus, the image acquisition processing of the samples S can be suitably controlled, and data corresponding to this can be suitably be managed by associating the sample group of the samples S and the data group in image acquisition with each other by use of the concept of session.

Next, an image pickup condition setting method in the image pickup condition setting unit 71 of the control unit 60 will be further described. In the image pickup condition setting unit 71, as described above, as image pickup conditions for acquiring a micro image of the sample S, an image acquiring range R corresponding to a range including an object S0 of image acquisition and focus information concerning the image acquisition of the object S0 in the image acquiring range R are set.

In the image acquiring apparatus of this embodiment, according to provision of the macro image acquiring unit 20 in the microscope unit 10, in the image pickup condition setting unit 71, image pickup conditions of a micro image including an image acquiring range R and focus information are set by referring to a macro image acquired by the macro image acquiring unit 20. In this case, preferably, the image pickup condition setting unit 71 sets an image acquiring range R and focus measuring positions P in the image acquiring range R automatically or manually by an operator by referring to a macro image acquired for the sample S (see FIG. 3(*b*)). Then, focus measurement is performed at the focus measuring position by using the micro image acquiring unit 30 via the micro image acquisition control unit 82, and focus information is set by referring to the result of measurement.

As a detailed method of focus measurement using the micro image acquiring unit 30, for example, a two-dimensional image of the sample S is acquired in a predetermined range including the focus measuring position P by using the image pickup device 31 or a separately provided image pickup device for focus measurement. Then, by using high contrast of the image when it is correctly focused, a method can be used in which a Z position (focus position) which is correctly focused at the focus measuring position P is determined. Setting of a plurality of focus measuring positions P and setting of a focal plane or a focus map using these when distribution of focus positions in a horizontal plane including the sample S must be considered are as described above.

As setting of image pickup conditions including focus information for the sample S and application of the image pickup conditions when acquiring a micro image, as shown in FIG. 3(*b*), when a single object S0 is present in the sample S, common focus information is set for the entirety of the image acquiring range R set corresponding to the object S0. As a method for setting such focus information, there is a method in which, for example, a single focal plane is set for the entirety of the image acquiring range R.

Figure 7:
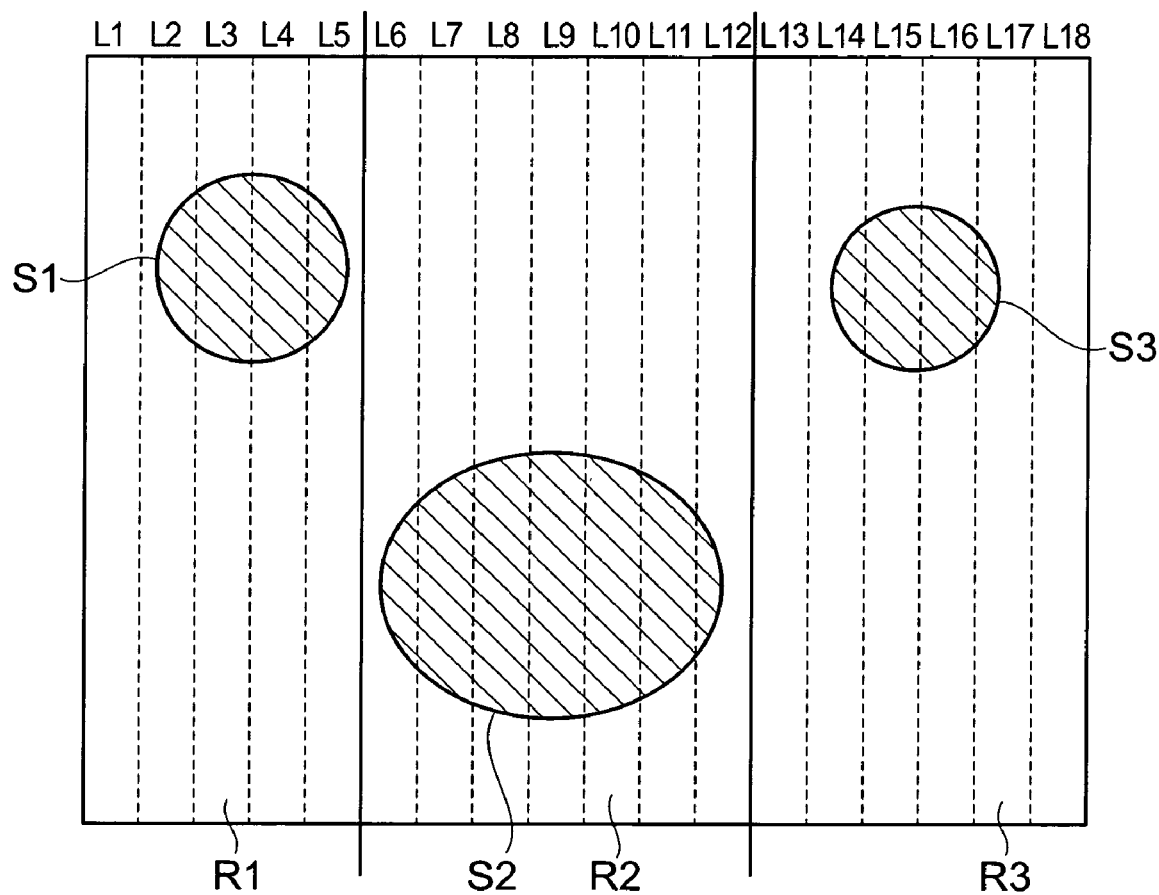
FIG. 7 is a drawing schematically showing an example of setting of image acquiring ranges for a sample.

On the other hand, in a sample S as an object of image acquisition, as shown in FIG. 7, a plurality of objects (three objects S1 through S3 in FIG. 7) may be present in the sample S. For example, when a slide containing biological samples of human bodies and animals (tissue samples) sealed in a slide glass is set as a sample S, the sizes of the biological samples as objects of image acquisition are various. Therefore, when the sizes of the biological samples are smaller than the size of the slide, a slide (sample) containing the plurality of biological samples (a plurality of objects) may be prepared. As a typical one, there is a tissue microarray containing many sampled specimens arranged.

The biological samples as objects of image acquisition are normally prepared by an operator so as to have the same sample thickness, however, depending on the accuracy of machinery to form slices and the skill level of the operator, the biological sample thickness or thickness distribution in the sample fluctuates. With such fluctuation, it is impossible to acquire favorable images of the respective samples by the method for setting a single image acquiring range including the plurality of biological samples and a corresponding single focal plane.

On the other hand, in the image acquiring apparatus of this embodiment, in the image pickup condition setting unit 71, the image acquiring range R with respect to the sample S is not always a single range, and a plurality of image acquiring ranges can be set. Such setting of a plurality of image acquiring ranges is performed automatically or manually by an operator by, for example, referring to a macro image of the sample S and considering the number, arrangement, and shapes of the images of the objects to be subject to micro image acquisition at high resolution in the macro image.

In detail, in the image example shown in FIG. 7, in the entire image acquiring range set for the sample S, images of three objects of a first object S1, a second object S2, and a third object S3 are present as the objects of image acquisition. Assuming image regions L1, L2, . . . , L18 corresponding to scanning regions of partial images when acquiring a micro image with respect to the image acquiring range on the macro image, the object S1 is present in the image regions L2 through L5, the object S2 is present in the image regions L6 through L12, and the object S3 is present in the image regions L14 through L17.

In this example, the plurality of image regions L1 through L18 corresponding to partial images of a micro image include no image region that includes mixing of images of a plurality of objects. Therefore, three image acquiring ranges can be set in which the image regions L1 through L5 are set as a first image acquiring range R1 corresponding to the object S1, the image regions L6 through L12 are set as a second image acquiring range R2 corresponding to the object S2, and the image regions L13 through L18 are set as a third image acquiring range R3 corresponding to the object S3, as shown divided by the solid lines in FIG. 7. The range combining these three image acquiring ranges R1 through R3 is the entire image acquiring range R.

In this case, corresponding to these image acquiring ranges R1 through R3, first focus information, second focus information, and third focus information are set as mutually different focus information. For these focus information, for example, as described above, a method in which focus measuring positions are set in images of the objects in the respective image acquiring ranges, and focus information are set by referring to the results of focus measurement performed for the focus measuring positions can be used. In the example of FIG. 7, as described above, the image regions include no image region that includes mixing of a plurality of image acquiring ranges, and focus information to be applied is corresponding single focus information in all image regions.

Figure 8:
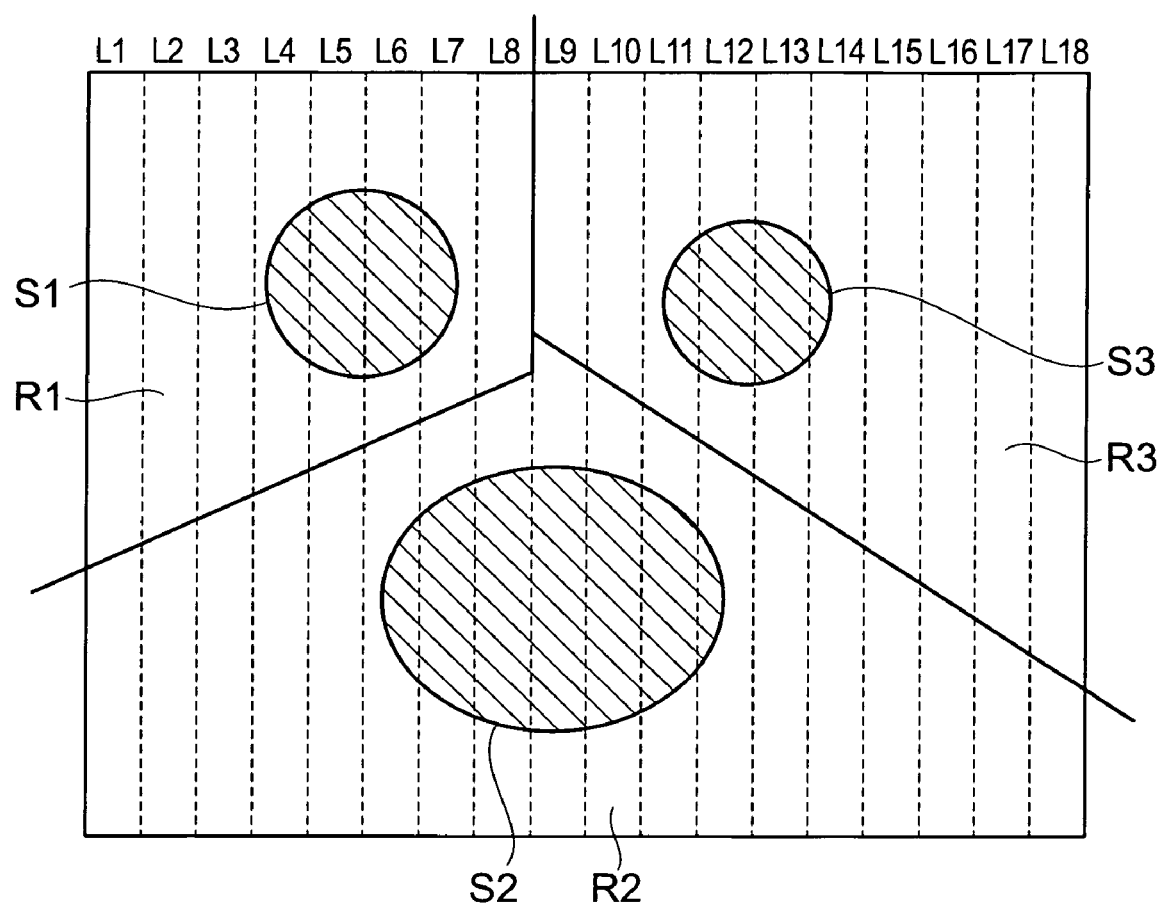
FIG. 8 is a drawing schematically showing an example of setting of image acquiring ranges for a sample.

On the other hand, in the image example shown in FIG. 8, images of three objects of a first object S1, a second object S2, and a third object S3 are present in the entire image acquiring range similarly to FIG. 7. Assuming image regions L1 through L18 in the image acquiring range on a macro image, the object S1 is present in the image regions L4 through L7, the object S2 is present in the image regions L6 through L12, and the object S3 is present in the image regions L11 through L14.

In such an example, the plurality of image regions L1 through L18 include image regions that include mixing of images of a plurality of objects. Therefore, in this case, as shown divided by the solid lines in FIG. 8, it is preferable that corresponding three image acquiring ranges R1 through R3 are set so that the objects S1 through S3 are positioned in the respective different image acquiring ranges.

Herein, focusing on, for example, the image region L7 among the image regions L1 through L18 (partial images in a micro image), this image region L7 includes mixing of the first region that forms the upper section thereof and belongs to the first image acquiring range R1 and a second region that forms the lower section and belongs to the second image acquiring range R2. Thus, for the image region including mixing of a plurality of image acquiring ranges, when scanning a corresponding partial image to acquire a micro image, in the respective first region and second region, focus information to be used for focus control is switched between first focus information and second focus information, and image pickup conditions are set so that the sample S is scanned to acquire this partial image.

Figure 9:
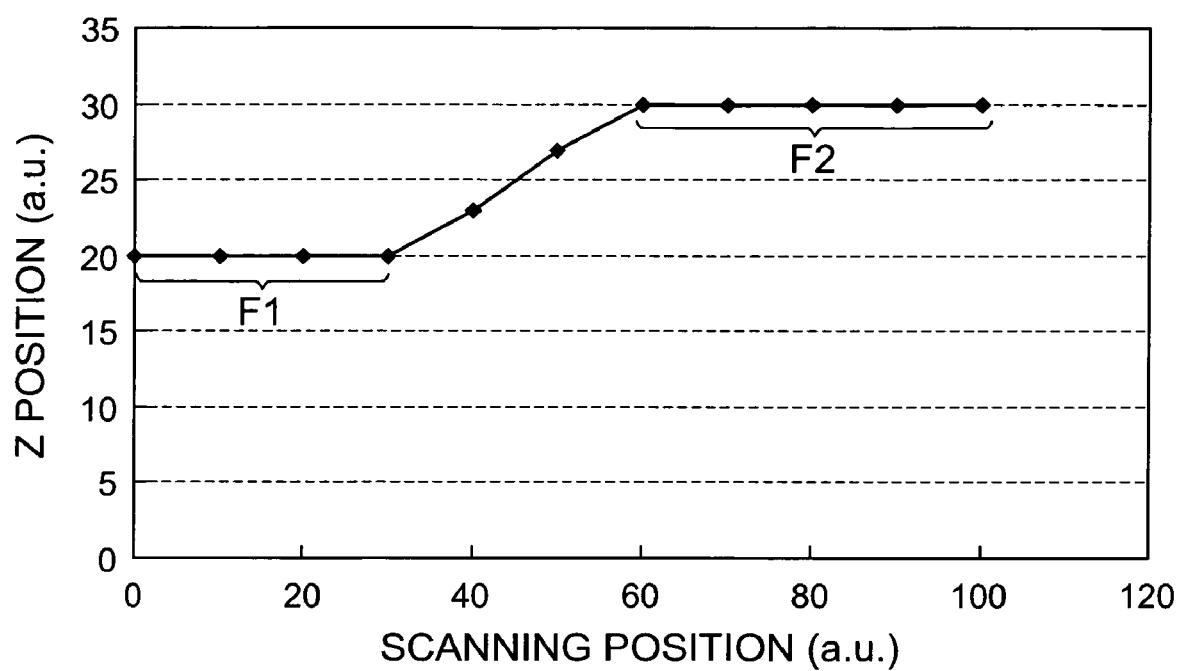
FIG. 9 is a graph showing an example of a sample scanning method for acquiring a partial image.

FIG. 9 is a graph showing an example of a sample scanning method for acquiring a partial image. In this graph, the horizontal axis indicates a position (a.u.) in the scanning direction, and the vertical axis indicates a Z position (a.u.) corresponding to a focus position. In this scanning example, in the first half scanning section F1, a first focal plane corresponding to the first image acquiring range R1 is applied to perform focus control. In the second half scanning section F2, the focus information is switched and a second focal plane F2 corresponding to the second image acquiring range R2 is applied to perform focus control.

A process corresponding to the image acquiring method performed in the image acquiring apparatus shown in FIG. 1 can be carried out by an image acquiring program for allowing the computer to execute the image acquisition processing. For example, the control unit 60 of the image acquiring apparatus can be made up of a CPU that runs each software program necessary for the image acquisition processing, a ROM in which the software programs are stored, and a RAM in which data is temporarily stored during program execution. The image acquiring apparatus and the image acquiring method mentioned above can be realized by executing a predetermined image acquiring program by the CPU in the thus formed structure.

It is possible to record the program for making the CPU execute the processes for sample image acquisition on a computer-readable storage media and distribute these. These recording media include, for example, magnetic media such as hard disks and flexible disks, optical media such as CD-ROMs and DVD-ROMs, magnetic optical media such as floptical disks, and hardware devices such as RAMs, ROMs, and semiconductor nonvolatile memories exclusively installed so as to execute or store program commands.

Effects of the image acquiring apparatus, image acquiring method, and image acquiring program according to this embodiment will be described.

In the above-described image acquiring apparatus, image acquiring method, and image acquiring program, for an object of image acquisition contained in the sample S, an image acquiring range R, and focus information such as a focal plane to be referred to for acquiring a micro image are set as image pickup conditions in the image pickup condition setting unit 71. Then, in such a structure, for example, when a plurality of image acquiring ranges are set for the sample S as in the case of a plurality of objects S1 through S3 contained in the sample S as shown in FIG. 7 and FIG. 8, focus information is separately obtained for each image acquiring range. Thereby, focus control for the entire sample including the plurality of image acquiring ranges can be preferably performed.

In addition, in the case where a plurality of image acquiring ranges and a plurality of corresponding focus information (for example, a plurality of focal planes or focus maps) are set for the sample S, when a plurality of partial images acquired by scanning the sample S include a partial image that includes mixing of a plurality of image acquiring ranges, for example, as shown in the graph of FIG. 9, focus information is switched in the middle of scanning of the partial image. In this structure, images of the respective objects can be acquired by one image acquisition processing while preferably performing focus control. Thereby, even when a plurality of objects are contained in a sample S, by setting a plurality of image acquiring ranges and focus information corresponding to the objects, images of the respective objects can be preferably acquired. In addition, an image acquiring operation necessary for such a sample S containing a plurality of objects is simplified.

In this case, it is preferable that, as the image pickup device 31 to be used for the micro image acquiring unit 30, an image pickup device 31 capable of acquiring a one-dimensional image or acquiring a two-dimensional image and performing TDI driving is used, and the micro image acquiring unit 30 is structured so that a direction orthogonal to a longitudinal direction of an image pickup plane in the image pickup device 31 is set as a scanning direction. In this case, in micro image acquisition controlled by the micro image acquisition control unit 82, it is preferable that a partial image is acquired by scanning a sample S in the scanning direction by the image pickup device 31 and this partial image acquisition is repeated a plurality of times while changing the image pickup position along the longitudinal direction of the image pickup plane to acquire a plurality of partial images that become a micro image.

With such a structure, as shown in FIG. 3(*a*), strip-like partial images are acquired at high resolution by scanning a sample S in one direction with a one-dimensional sensor or a TDI-drive two-dimensional sensor and the plurality of partial images are combined in another direction into a micro image showing the entire sample S, whereby image data of the sample can be preferably acquired at sufficiently high resolution.

In the image acquiring apparatus shown in FIG. 1, a macro image acquiring unit 20 is provided in addition to the micro image acquiring unit 30, and an image acquiring range and focus information as image pickup conditions of a micro image are set by referring to a macro image in the image pickup condition setting unit 71. Thereby, image pickup conditions of a micro image of the sample S can be preferably set and a micro image with resolution as high as that used as image data of the sample in, for example, a virtual microscope can be efficiently acquired.

In the above-described image acquiring apparatus, as a method for setting focus information such as a focal plane when acquiring a micro image of the sample S, in the image pickup condition setting unit 71, an image acquiring range R and focus measuring positions P in the image acquiring range R are set, and by referring to the result of focus measurement at the focus measuring positions P, focus information is set.

By thus setting focus information upon first setting focus measuring positions P and performing focus measurement at the focus measuring positions P for the sample S, an image of an object contained in the sample S can be favorably acquired. In this case, as described above, it is preferable that an image acquiring range R and focus measuring positions P are set by referring to a macro image acquired by the macro image acquiring unit 20, and then focus information such as a focal plane or focus map are set by performing focus measurement at the focus measuring positions P by using the micro image acquiring unit 30.

As a method for setting an image acquiring range when a plurality of objects are contained in the sample S, when a first object S1 and a second object S2 are discriminated as objects of image acquisition in the sample S (see FIG. 8), it is preferable that in the image pickup condition setting unit 71, a first image acquiring range R1 and a second image acquiring range R2 are set by dividing the image of the sample between an image of the first object S1 and an image of the second object S2.

Thereby, even when a plurality of objects are contained in the sample S, a plurality of corresponding image acquiring ranges can be preferably and reliably set. For setting a dividing line between the images of the first and second objects, for example, a method in which the boundary between the first and second objects obtained by applying dilation processing to the images of the objects in a macro image can be used as a dividing line. Other various setting methods can also be used.

In detail, for example, after binarizing the macro image, dilation processing (processing for enlarging the mass of a picture) is applied to the binarized macro image including the images of the plurality of objects. Then, a method in which image acquiring ranges are set by using the boundary between the objects formed when dilating the respective objects to the largest sizes as a dividing line can be used. In such a method, the middle position between the adjacent objects becomes a dividing position of the image acquiring ranges. Thus, the method in which the middle position between the objects is used as a dividing position is also effective for preventing influence from deviation of image pickup positions between a macro image and a micro image or influence from driving displacement when driving the objective lens 32 by the Z stage 33 (see FIG. 2).

In such a setting of a plurality of image acquiring ranges, as in the above-described example of dilation processing, it is preferable to use a setting method in which the ranges can be automatically set by using a predetermined setting algorithm. This automatic image pickup condition setting is effective when image acquisition processing is performed for a plurality of samples S as objects set in the sample storage unit 11 as in the image acquiring apparatus shown in FIG. 1.

Figure 10:
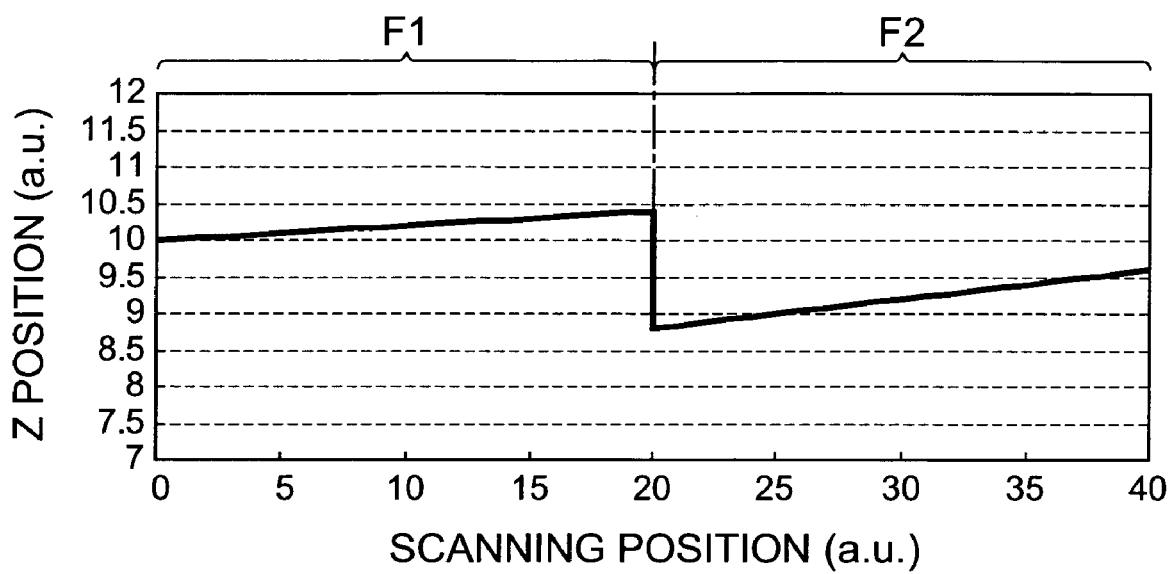
FIG. 10 is a graph showing an example of a sample scanning method for acquiring a partial image.

In addition, for switching of focus information in scanning of a sample S for acquiring a partial image, as shown in the graph of FIG. 10, a method can be used in which a first focal plane is applied in the first half scanning section F1 corresponding to the first region belonging to the first image acquiring range R1, a second focal plane is applied in the second half scanning section F2 corresponding to the second region belonging to the second image acquiring range R2, and the focal plane to be applied is switched at the boundary between the sections F1 and F2. This focus information switching method is preferable when, for example, the Z stage 33 of the objective lens 32 to be used for focus control is formed by using a piezo actuator and switching at a high speed is possible.

Figure 11:
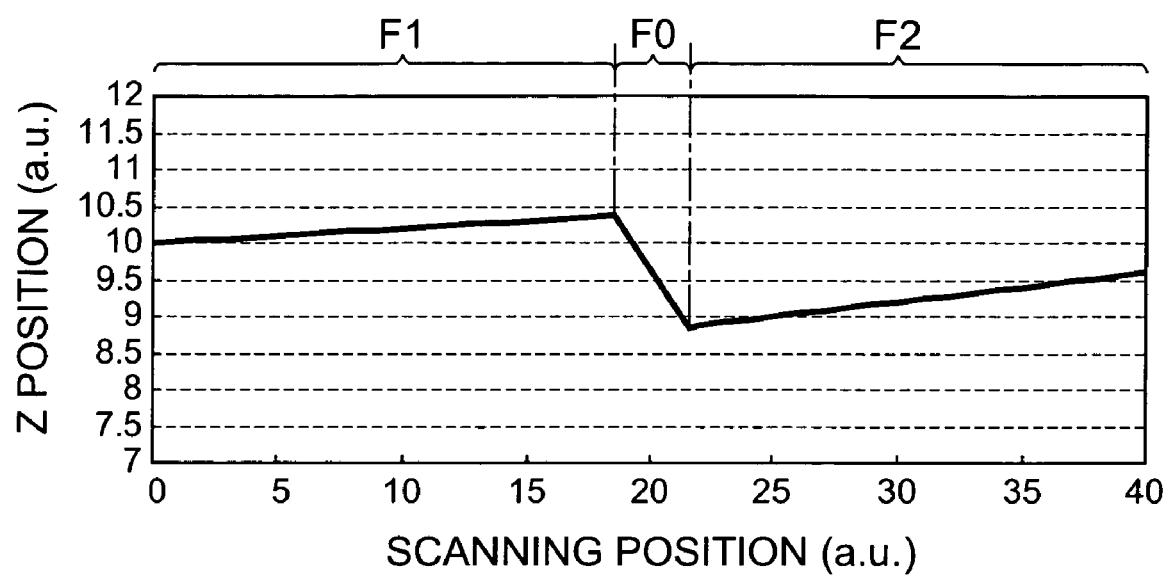
FIG. 11 is a graph showing an example of a sample scanning method for acquiring a partial image.

Alternatively, as shown in the graph of FIG. 11, similarly, a first focal plane is applied in the first half scanning section F1 corresponding to the first region belonging to the first image acquiring range R1, a second focal plane is applied in the second half scanning section F2 corresponding to the second region belonging to the second image acquiring range R2, and the focal plane is switched by defining a section with a predetermined width including the boundary between the sections F1 and F2 as a switching section F0. This focus information switching method is preferable when, for example, the Z stage 33 is formed by using a stepping motor and following a Z position change at a high speed is difficult. In this case, it is preferable that the rate of Z position change in the switching section F0 is set to be equal to or less than a maximum rate of change by driving means such as a stepping motor.

Focus information switching when scanning such a partial image can be performed two or more times as appropriate. For example, in the example shown in FIG. 12, the image region (partial image scanning region) L includes mixing of images of two objects S1 and S2 as shown in FIG. 12(a). In detail, when viewing the image region L along the scanning direction, as shown in FIG. 12(b), the image region includes a region R2a including an image of the object S2, a region R0a that does not include an image of an object, a region R1a including an image of the object S1, a region R0b that does not include an image of an object, and a region R2b including an image of the object S2.

Corresponding to this, a first region R1 that includes the region R1a and forms a first image acquiring range and a second region R2 that includes regions R2a and R2b and forms a second image acquiring range are set by using the middle points of the respective regions R0a and R0b as boundaries, and focus information switching can be performed between corresponding scanning sections F1 and F2. This focus information switching can be executed in the same manner when the image region includes mixing of images of three or more objects.

In addition, in the image pickup condition setting unit 71, even when the first image acquiring range and the second image acquiring range are set and first focus information and second focus information are correspondingly set, in the case of a partial image that does not include mixing of a plurality of image acquiring ranges, that is, for example, a partial image in which the first region belonging to the first image acquiring range is present and the second region belonging to the second image acquiring range is not present, it is preferable that the sample is scanned for acquiring the partial image by setting focus information as single first focus information.

Thereby, when a plurality of image acquiring ranges are set for the sample S, in micro image acquisition, sample scanning for acquiring partial images can be preferably performed for both the partial image including mixing of a plurality of image acquiring ranges and the partial image that does not include mixing of such image acquiring ranges.

Figure 13:
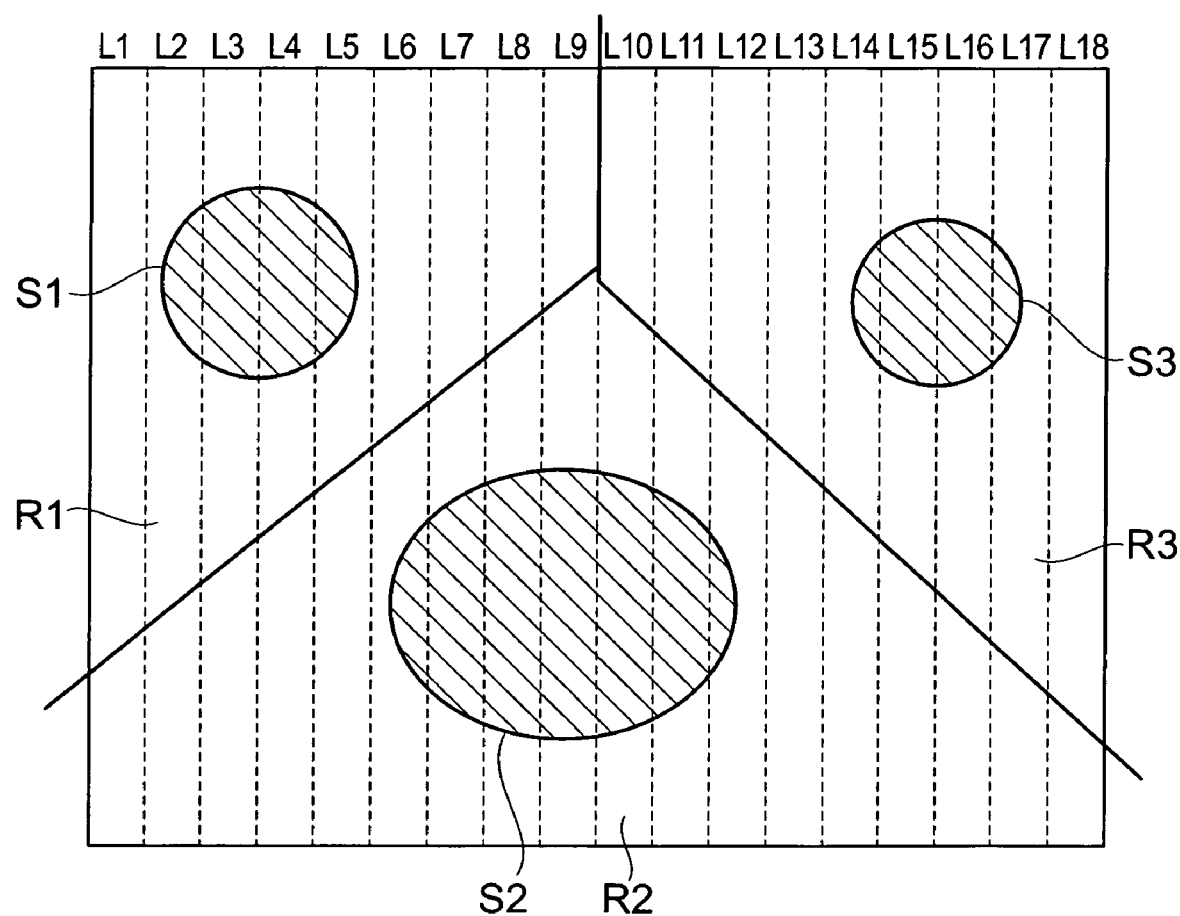
FIG. 13 is a drawing schematically showing an example of setting of image acquiring ranges for a sample.

However, for scanning a sample in a partial image that does not include mixing of a plurality of image acquiring ranges, a scanning method suitable for the detailed image acquiring range setting method may be used. For example, in the image example shown in FIG. 13, the arrangement of the objects S1 through S3 is the same as in the example of FIG. 7, however, the method for setting corresponding image acquiring ranges R1 through R3 is different. Namely, in the example of FIG. 13, although an image region including mixing of a plurality of objects is not present, a setting method similar to that of the example of FIG. 8 is used for setting the image acquiring ranges R1 through R3. In such a method, when setting of a plurality of image acquiring ranges is necessary, image acquiring ranges can be set by the same method regardless of the presence of an image region including mixing of images of a plurality of objects.

In the image acquiring apparatus of the embodiment, in the control unit 60, as a control mode for controlling acquisition of macro images, image pickup condition setting, and micro image acquisition of the respective samples S, a semi-automatic mode is provided in which necessary confirmation is made by an operator when setting image pickup conditions of a micro image by referring to a macro image. Thereby, even when an extra object is contained in a slide as a sample S, influence therefrom can be reliably excluded and correct image pickup conditions for the sample can be set.

In the semi-automatic mode, a sample S whose macro image has been acquired by the macro image acquiring unit 20 is arranged at a standby position. In such a structure, acquisition of a macro image of the sample S and setting of image pickup conditions using the macro image can be performed independently from micro image acquisition. Thereby, after acquiring macro images of a plurality of samples S and finishing setting of image pickup conditions, it becomes unnecessary that the operator stays beside the image acquiring apparatus until the micro image acquisition is completed. Thereby, the workload of the operator is remarkably reduced.

As for the standby position of the sample S whose macro image has been acquired, in the above embodiment, the storage position in the sample storage unit 11 is set as the standby position, and the sample S whose macro image has been acquired is returned to the storage position again. Thereby, the structure of the microscope unit 10 can be simplified. Alternatively, it is also possible that a sample standby unit which can make a plurality of samples S standby is provided separately from the sample storage unit 11.

In the above-described image acquiring apparatus, as sample moving means for moving the respective samples S among a storage position in the sample storage unit 11, a standby position (corresponding to the storage position in the above-described structure), and image acquiring positions for the macro image acquiring unit 20 and the micro image acquiring unit 30, a sample transfer unit 14 and a sample stage 15 as an XY stage are provided. In such a structure, macro image acquisition, image pickup condition setting, and micro image acquisition can be preferably realized while moving the samples S among the respective positions.

The full-automatic mode, in addition to the semi-automatic mode, is prepared as the image acquiring operation control mode of the control unit 60. According this structure, for image acquisition, the operator appropriately selects either the semi-automatic mode or the full-automatic mode as the control mode that controls the acquisition of a macro image with respect to each sample, the setting of an image pickup condition, and the acquisition of a micro image, accordingly, depending on a state of samples S of the objects of image acquisition, for example, depending on the fact that a sample S has much dust or a little dust, image acquisition can be carried out according to a suitable method. Concerning these control modes, switching between the control modes may be performed, for example, switching to the full-automatic mode may be performed during an operation in the semi-automatic mode. Preferably, both in the full-automatic mode and in the semi-automatic mode, an image acquiring operation for a sample S can be again performed if a micro image acquired with respect to the sample S has a problem after the completion of the image acquisition processing.

The image acquiring apparatus, the image acquiring method, and the image acquiring program of the present invention are not limited to those in the embodiment and structure examples, and they can be variously modified. For example, in the above-described embodiment, an image acquiring range and focus measuring positions are set as image pickup conditions of a micro image by referring to a macro image in the image pickup condition setting unit 71, and focus information for the sample S is acquired based on the focus measuring positions, however, other various methods can also be used as the method for setting an image acquiring range and focus information for the sample.

In the image acquiring apparatus according to the above embodiment, the macro image acquiring unit 20 and the micro image acquiring unit 30 are disposed independently of each other, however, the light sources and the image acquiring means may be formed as a single light source and a single image acquiring means, respectively, by providing an optical system for image acquisition switchable in accordance with the acquisition of a macro image or a micro image. In this case, an optical system provided with a revolver including an objective lens for macro image acquisition and an objective lens for micro image acquisition can be mentioned as an example of the switchable optical system for image acquisition.

In the above embodiment, the image pickup device capable of acquiring a one-dimensional image or the image pickup device capable of acquiring a two-dimensional image and capable of performing TDI driving is shown as the image pickup device 31 in the micro image acquiring unit 30, however, without being limited to this, an image pickup device, such as a two-dimensional CCD camera (area sensor), may be used. In this case, a micro image of the whole of a sample S can be produced by acquiring a plurality of high-resolution tile images and combining these images together, as is disclosed by U.S. Pat. No. 6,816,606.

Additionally, in the above embodiment, the image acquiring apparatus is formed by using the transmission type microscope system, however, the present invention is not limited to this. For example, in fluorescent observation, the transmission type light source may be replaced by an epi-illumination type light source so as to form a reflection type microscope system.

For example, when a micro image acquiring apparatus is provided separately from the image acquiring apparatus for acquiring a macro image, in an image acquiring apparatus for a macro image, a method for acquiring a micro image in the micro image acquiring apparatus is properly assumed and image pickup conditions are set in the same method as described above.

In this case, the image acquiring apparatus includes a macro image acquiring unit for acquiring a macro image of a sample and an image pickup condition setting unit for setting an image acquiring range corresponding to a range including an object of image acquisition and focus information concerning the image acquisition of the object in the image acquiring range as image pickup conditions for a micro image of the sample by referring to the macro image.

In this structure, for properly assuming the micro image acquiring method, it is preferable that the image pickup condition setting unit assumes, as a micro image acquiring method, a method in which micro image acquiring means that has an image pickup device capable of acquiring a one-dimensional image or a two-dimensional image and sets one direction on an image pickup plane in the image pickup device as a scanning direction for acquiring a micro image, is used to acquire a partial image by scanning the sample in the scanning direction by the image pickup device, and a plurality of partial images that become a micro image are acquired by repeating the partial image acquisition a plurality of times while changing the image pickup position along another direction of the image pickup plane.

As setting of image pickup conditions, similarly to the above-described embodiment, it is preferable that, when at least a first image acquiring range and a second image acquiring range are set as the image acquiring range, the image pickup condition setting unit sets corresponding first focus information and second focus information as the focus information, and when a partial image among a plurality of partial images includes mixing of a first region belonging to the first image acquiring range and a second region belonging to the second image acquiring range, the image pickup conditions are set so that the sample is scanned for acquiring the partial image while switching the focus information between first focus information and second focus information in the respective first region and second region. The same structure applies to the image acquiring method and the image acquiring program.

Herein, the image acquiring apparatus of the embodiment includes (1) micro image acquiring means for acquiring a micro image of a sample by scanning the sample at a predetermined resolution, image pickup condition setting means for setting, for the sample, an image acquiring range corresponding to a range including an object of image acquisition and focus information concerning the image acquisition of the object in the image acquiring range, and micro image acquisition control means for controlling a micro image acquiring operation of the micro image acquiring means, (2) the micro image acquiring means has an image pickup device capable of acquiring a one-dimensional image or a two-dimensional image and sets one direction on an image pickup plane in the image pickup device as a scanning direction for acquiring a micro image, (3) the micro image acquisition control means performs control so that a partial image is acquired by scanning the sample in the scanning direction by the image pickup device and a plurality of partial images that become a micro image are acquired by repeating the partial image acquisition a plurality of times, while changing an image pickup position along another direction of the image pickup plane, and (4) when at least a first image acquiring range and a second image acquiring range are set as the image acquiring range, the image pickup condition setting means sets corresponding first focus information and second focus information as the focus information, and when a partial image among the plurality of partial images includes mixing of a first region belonging to the first image acquiring range and a second region belonging to the second image acquiring range, the focus information is switched between the first focus information and the second focus information in the respective first region and second region to perform sample scanning for acquiring the partial image.

The image acquiring method includes (1) a micro image acquiring step for acquiring a micro image of a sample by scanning the sample at a predetermined resolution, an image pickup condition setting step for setting, for the sample, an image acquiring range corresponding to a range including an object of image acquisition and focus information concerning the image acquisition of the object in the image acquiring range, and a micro image acquisition control step for controlling a micro image acquiring operation at the micro image acquiring step, (2) the micro image acquiring step uses an image pickup device capable of acquiring a one-dimensional image or a two-dimensional image and sets one direction on an image pickup plane in the image pickup device as a scanning direction for acquiring a micro image, (3) the micro image acquisition control step performs control for acquiring a partial image by scanning the sample in the scanning direction by the image pickup device and acquiring a plurality of partial images that become a micro image by repeating the partial image acquisition a plurality of times while changing the image pickup position along another direction of the image pickup plane, (4) when at least a first image acquiring range and a second image acquiring range are set as the image acquiring range, the image pickup condition setting step sets corresponding first focus information and second focus information as the focus information, and when a partial image among the plurality of partial images includes mixing of a first region belonging to the first image acquiring range and a second region belonging to the second image acquiring range, the focus information is switched between the first focus information and the second focus information in the respective first region and second region to perform sample scanning for acquiring the partial image.

The image acquiring program is (1) applied to an image acquiring apparatus including micro image acquiring means for acquiring a micro image of a sample by scanning the sample at a predetermined resolution, and makes a computer execute image pickup condition setting processing for setting, for the sample, an image acquiring range corresponding to a range including an object of image acquisition and focus information concerning the image acquisition of the object in the image acquiring range, and micro image acquisition control processing for controlling a micro image acquiring operation of the micro image acquiring means, (2) the micro image acquiring means has an image pickup device capable of acquiring a one-dimensional image or a two-dimensional image and sets one direction on an image pickup plane in the image pickup device as a scanning direction for acquiring a micro image, (3) the micro image acquiring control processing performs control so that a partial image is acquired by scanning the sample in the scanning direction by the image pickup device and a plurality of partial images that become a micro image are acquired by repeating the partial image acquisition a plurality of times while changing the image pickup position along another direction of the image pickup plane, (4) when at least a first image acquiring range and a second image acquiring range are set as the image acquiring range, the image pickup condition setting processing sets corresponding first focus information and second focus information as the focus information, and when a partial image among the plurality of partial images includes mixing of a first region belonging to the first image acquiring range and a second region belonging to the second image acquiring range, the focus information is switched between the first focus information and the second focus information in the respective first region and second region to perform sample scanning for acquiring the partial image.

Herein, it is preferable that the image acquiring apparatus is structured so that the micro image acquiring means has an image pickup device capable of acquiring a one-dimensional image or acquiring a two-dimensional image and performing TDI driving, and a direction orthogonal to the longitudinal direction of the image pickup plane in the image pickup device is set as a scanning direction, and the micro image acquisition control means performs control so that a partial image is acquired by scanning the sample in the scanning direction by the image pickup device and a plurality of partial images are acquired by repeating this partial image acquisition a plurality of times while changing the image pickup position along the longitudinal direction of the image pickup plane.

Similarly, in the image acquiring method, it is preferable that the micro image acquiring step uses an image pickup device capable of acquiring a one-dimensional image or acquiring a two-dimensional image and performing TDI driving and sets a direction orthogonal to the longitudinal direction of the image pickup plane in the image pickup device as a scanning direction, and the micro image acquisition control step performs control so that a partial image is acquired by scanning a sample in the scanning direction by the image pickup device and a plurality of partial images are acquired by repeating the partial image acquisition a plurality of times while changing the image pickup position along the longitudinal direction of the image pickup plane.

Similarly, in the image acquiring program, it is preferable that the micro image acquiring means has an image pickup device capable of acquiring a one-dimensional image or acquiring a two-dimensional image and performing TDI driving and sets a direction orthogonal to the longitudinal direction of the image pickup plane in the image pickup device as a scanning direction, and the micro image acquisition control processing performs control so that a partial image is acquired by scanning a sample in the scanning direction by the image pickup device and a plurality of partial images are acquired by repeating the partial image acquisition a plurality of times while changing the image pickup position along the longitudinal direction of the image pickup plane.

According to this structure, strip-like partial images by scanning the sample in one direction with a one-dimensional sensor or a TDI-driven two-dimensional sensor are acquired with high resolution, and the partial images are combined together in another direction so as to be used as a micro image of the whole of the sample, therefore, image data concerning the samples can be suitably acquired with fully high resolution.

It is preferable that the image acquiring apparatus further includes macro image acquiring means for acquiring a macro image of a sample, and the image pickup condition setting means sets an image acquiring range and focus information by referring to the macro image. Similarly, it is preferable that the image acquiring method further includes a macro image acquiring step for acquiring a macro image of a sample, and the image pickup condition setting step sets an image acquiring range and focus information by referring to the macro image. Similarly, in the image acquiring program, it is preferable that the image acquiring apparatus further includes macro image acquiring means for acquiring a macro image of a sample, and the image pickup condition setting processing sets an image acquiring range and focus information by referring to the macro image.

Thus, by providing macro image acquiring means and micro image acquiring means for a sample as an object of image acquisition and acquiring a micro image with high resolution upon setting image pickup conditions by referring to a macro image showing the entire image of the sample, a micro image of the sample having resolution as high as that used as image data of the sample in, for example, a virtual microscope can be efficiently acquired.

In the image acquiring apparatus, it is preferable that the image pickup condition setting means sets an image acquiring range and a focus measuring position in the image acquiring range, and sets focus information by referring to the result of focus measurement on the focus measuring position. Similarly, in the image acquiring method, it is preferable that the image pickup condition setting step sets an image acquiring range and a focus measuring position in the image acquiring range, and sets focus information by referring to the result of focus measurement on the focus measuring position. Similarly, in the image acquiring program, it is preferable that the image pickup condition setting processing sets an image acquiring range and a focus measuring position in the image acquiring range, and sets focus information by referring to the result of focus measurement on the focus measuring position.

Thus, by setting focus information after setting focus measuring positions and performing focus measurement for the sample on the focus measuring positions, it becomes possible to acquire a favorable image of an object contained in the sample. In this case, it is preferable that an image acquiring range and focus measuring positions are set by referring to a macro image acquired by the macro image acquiring means, and focus information such as a focus map is set by performing focus measurement on the focus measuring positions by using the micro image acquiring means.

In the image acquiring apparatus, it is preferable that, when at least a first image acquiring range and a second image acquiring range are set as the image acquiring range, the image pickup condition setting means sets corresponding first focus information and second focus information as the focus information, and when a partial image among the plurality of partial images includes a first region belonging to the first image acquiring range and does not include a second region belonging to the second image acquiring range, the focus information is set as the first focus information to perform sample scanning for acquiring the partial image.

Similarly, in the image acquiring method, it is preferable that, when at least a first image acquiring range and a second image acquiring range are set as the image acquiring range, the image pickup condition setting step sets corresponding first focus information and second focus information as the focus information, and when a partial image among the plurality of partial images include a first region belonging to the first image acquiring range and does not include a second region belonging to the second image acquiring range, the focus information is set as the first focus information to perform sample scanning for acquiring the partial image.

Similarly, in the image acquiring program, it is preferable that, when at least a first image acquiring range and a second image acquiring range are set as the image acquiring range, the image pickup condition setting processing sets corresponding first focus information and second focus information as the focus information, and when a partial image among the plurality of partial images includes a first region belonging to the first image acquiring range and does not include a second region belonging to the second image acquiring range, the focus information is set as the first focus information to perform sample scanning for acquiring the partial image.

Thereby, when a plurality of image acquiring ranges are set for a sample, in acquisition of partial images which become a micro image, it becomes possible to preferably perform sample scanning for acquiring both a partial image that includes mixing of a plurality of image acquiring ranges and a partial image that does not include mixing of image acquiring ranges.

As setting of image acquiring ranges, in the image acquiring apparatus, it is preferable that, when at least a first object and a second object are discriminated as objects in the sample, the image pickup condition setting means sets a first image acquiring range and a second image acquiring range by dividing the image of the sample between an image of the first object and an image of the second object.

Similarly, in the image acquiring method, it is preferable that, when at least a first object and a second object are discriminated as objects in a sample, the image pickup condition setting step sets a first image acquiring range and a second image acquiring range by dividing the image of the sample between an image of the first object and an image of the second object.

Similarly, in the image acquiring program, it is preferable that, when at least a first object and a second object are discriminated as objects in a sample, the image pickup condition setting processing sets a first image acquiring range and a second image acquiring range by dividing the image of the sample between an image of the first object and an image of the second object.

Thereby, even when a plurality of objects are contained in a sample, a plurality of image acquiring ranges corresponding to the objects can be preferably and reliably set. For setting a dividing line between the images of the first and second objects, various setting methods such as a method in which a boundary between the first and second objects obtained by applying dilation processing to the images of the objects in a macro image can be used.

Alternatively, the image acquiring apparatus includes (1) macro image acquiring means for acquiring a macro image of a sample and image pickup condition setting means for setting an image acquiring range corresponding to a range including an object of image acquisition and focus information concerning the image acquisition of the object in the image acquiring range as image pickup conditions of a micro image of the sample by referring to the macro image, (2) the image pickup condition setting means assumes, as a micro image acquiring method, a method in which micro image acquiring means that has an image pickup device capable of acquiring a one-dimensional image or a two-dimensional image and sets one direction on an image pickup plane in the image pickup device as a scanning direction for acquiring a micro image, is used to acquire a partial image by scanning the sample in the scanning direction by the image pickup device, and a plurality of partial images that become a micro image are acquired by repeating this partial image acquisition a plurality of times while changing the image pickup position along another direction of the image pickup plane, and (3) when at least a first image acquiring range and a second image acquiring range are set as the image acquiring range, the image pickup condition setting means sets corresponding first focus information and second focus information as the focus information, and when a partial image among the plurality of partial images includes mixing of a first region belonging to the first image acquiring range and a second region belonging to the second image acquiring range, the image pickup conditions are set so that sample scanning for acquiring the partial image is performed by switching the focus information between the first focus information and the second focus information in the respective first region and second region.

It is also possible that the image acquiring method includes (1) a macro image acquiring step for acquiring a macro image of a sample, and an image pickup condition setting step for setting an image acquiring range corresponding to a range including an object of image acquisition and focus information concerning the image acquisition of the object in the image acquiring range as image pickup conditions of a micro image of the sample by referring to the macro image, (2) the image pickup condition setting step assumes, as a micro image acquiring method, a method in which micro image acquiring means that has an image pickup device capable of acquiring a one-dimensional image or a two-dimensional image and sets one direction on an image pickup plane in the image pickup device as a scanning direction for acquiring a micro image, is used to acquire a partial image by scanning the sample in the scanning direction by the image pickup device, and a plurality of partial images that become a micro image are acquired by repeating this partial image acquisition a plurality of times while changing the image pickup position along another direction of the image pickup plane, (3) when at least a first image acquiring range and a second image acquiring range are set as the image acquiring range, the image pickup condition setting step sets corresponding first focus information and second focus information as the focus information, and when a partial image among the plurality of partial images include mixing of a first region belonging to the first image acquiring range and a second region belonging to the second image acquiring range, the image pickup conditions are set so that sample scanning for acquiring the partial image is performed by switching the focus information between the first focus information and the second focus information in the respective first region and second region.

It is also possible that the image acquiring program is (1) applied to an image acquiring apparatus having macro image acquiring means for acquiring a macro image of a sample, and makes a computer execute image pickup condition setting processing for setting an image acquiring range corresponding to a range including an object of image acquisition and focus information concerning the image acquisition of the object in the image acquiring range as image pickup conditions of a micro image of the sample by referring to a macro image, (2) the image pickup condition setting processing assumes, as a micro image acquiring method, a method in which micro image acquiring means that has an image pickup device capable of acquiring a one-dimensional image or a two-dimensional image and sets one direction on an image pickup plane in the image pickup device as a scanning direction for acquiring a micro image, is used to acquire a partial image by scanning the sample in the scanning direction by the image pickup device, and a plurality of partial images that become a micro image are acquired by repeating this partial image acquisition a plurality of times while changing an image pickup position along another direction of the image pickup plane, and (3) when at least a first image acquiring range and a second image acquiring range are set as the image acquiring range, the image pickup condition setting processing sets corresponding first focus information and second focus information as the focus information, and when a partial image among the plurality of partial images includes mixing of a first region belonging to the first image acquiring range and a second region belonging to the second image acquiring range, the image pickup conditions are set so that sample scanning for acquiring the partial image is performed by switching the focus information between the first focus information and the second focus information in the respective first region and second region.

The present invention is applicable as an image acquiring apparatus, an image acquiring method, and an image acquiring program which is capable of preferably acquiring images of a plurality of objects even when the plurality of objects are contained in a sample.

What is claimed is:

1. An image acquiring apparatus comprising:
   micro image acquiring means for acquiring a micro image of a sample by scanning the sample at a predetermined resolution;
   image pickup condition setting means for setting, for the sample, an image acquiring range corresponding to a range including an object of image acquisition and focus information concerning the image acquisition of the object in the image acquiring range; and
   micro image acquisition control means for controlling an operation for acquiring the micro image of the micro image acquiring means, wherein
   the micro image acquiring means has an image pickup device capable of acquiring a one-dimensional image or a two-dimensional image and sets one direction on an image pickup plane in the image pickup device as a scanning direction for acquiring the micro image,
   the micro image acquisition control means performs control so that a partial image is acquired by scanning the sample in the scanning direction by the image pickup device and a plurality of partial images that become the micro image are acquired by repeating this partial image acquisition a plurality of times while changing an image pickup position along another direction of the image pickup plane, and
   when at least a first image acquiring range and a second image acquiring range are set as the image acquiring range, the image pickup condition setting means
   sets three or more first focus measuring positions in the first image acquiring range, and sets first focus information as the focus information for the first image acquiring range by referring to results of focus measurements on the first focus measuring positions performed by using the micro image acquiring means,
   sets three or more second focus measuring positions in the second image acquiring range, and sets second focus information as the focus information for the second image acquiring range by referring to results of focus measurements on the second focus measuring positions performed by using the micro image acquiring means, and
   when a partial image among the plurality of partial images includes mixing of a first region belonging to the first image acquiring range and a second region belonging to the second image acquiring range, the focus information is switched between the first focus information and the second focus information in the respective first region and second region to perform scanning of the sample for acquiring the partial image, and wherein
   when at least a first object and a second object are discriminated as the object, the image pickup condition setting means sets the first image acquiring range and the second image acquiring range for the sample by dividing an image of the sample between an image of the first object and an image of the second object, and
   in dividing the image of the sample, a boundary between the first object and the second object, obtained by applying dilation processing to the image of the first object and the image of the second object, is set as a dividing line for the first image acquiring range and the second image acquiring range.

2. The image acquiring apparatus according to claim 1, comprising macro image acquiring means for acquiring a macro image of the sample, wherein
   the image pickup condition setting means sets the first image acquiring range, the first focus measuring positions, the second image acquiring range, and the second focus measuring positions by referring to the macro image.

3. The image acquiring apparatus according to claim 1, wherein when a partial image among the plurality of partial images includes a first region belonging to the first image acquiring range and does not include a second region belonging to the second image acquiring range, the focus information is set as the first focus information to perform scanning of the sample for acquiring the partial image.

4. The image acquiring apparatus according to claim 1, wherein
   the first focus information is a focal plane or a two-dimensional focus map applied to the first image acquiring range, and
   the second focus information is a focal plane or a two-dimensional focus map different from the first focus information and applied to the second image acquiring range.

5. The image acquiring apparatus according to claim 1, wherein, in setting the first image acquiring range and the second image acquiring range by the image pickup condition setting means,
   the image of the sample is binarized, the dilation processing for enlarging the mass of a picture is applied to the binarized image of the sample including the image of the first object and the image of the second object, and the first image acquiring range and the second image acquiring range are set by using the boundary between the first object and the second object, formed when dilating the first object and the second object respectively to the largest sizes, as the dividing line.

6. A non-transitory record medium having an image acquiring program recorded thereon to be readable by a computer, the image acquiring program being applied to an image acquiring apparatus including a micro image acquiring means for acquiring a micro image of a sample by scanning the sample at a predetermined resolution, and makes a computer execute:

image pickup condition setting processing for setting, for the sample, an image acquiring range corresponding to a range including an object of image acquisition, and focus information concerning the image acquisition of the object in the image acquiring range; and micro image acquisition control processing for controlling an operation for acquiring the micro image of the micro image acquiring means, wherein the micro image acquiring means has an image pickup device capable of acquiring a one-dimensional image or a two-dimensional image and sets one direction on an image pickup plane in the image pickup device as a scanning direction for acquiring the micro image, the micro image acquisition control processing performs control so that a partial image is acquired by scanning the sample in the scanning direction by the image pickup device, and a plurality of partial images that become the micro image are acquired by repeating this partial image acquisition a plurality of times while changing an image pickup position along another direction of the image pickup plane, and when at least a first image acquiring range and a second image acquiring range are set as the image acquiring range, the image pickup condition setting processing sets three or more first focus measuring positions in the first image acquiring range, and sets first focus information as the focus information for the first image acquiring range by referring to results of focus measurements on the first focus measuring positions performed by using the micro image acquiring means, sets three or more second focus measuring positions in the second image acquiring range, and sets second focus information as the focus information for the second image acquiring range by referring to results of focus measurements on the second focus measuring positions performed by using the micro image acquiring means, and when a partial image among the plurality of partial images includes mixing of a first region belonging to the first image acquiring range and a second region belonging to the second image acquiring range, the focus information is switched between the first focus information and the second focus information in the respective first region and second region to perform scanning of the sample for acquiring the partial image, and wherein when at least a first object and a second object are discriminated as the object, the image pickup condition setting processing sets the first image acquiring range and the second image acquiring range for the sample by dividing an image of the sample between an image of the first object and an image of the second object, and in dividing the image of the sample, a boundary between the first object and the second object, obtained by applying dilation processing to the image of the first object and the image of the second object, is set as a dividing line for the first image acquiring range and the second image acquiring range.

7. The information record medium having an image acquiring program according to claim 6, wherein the image acquiring apparatus comprises macro image acquiring means for acquiring a macro image of the sample, and the image pickup condition setting processing sets the first image acquiring range, the first focus measuring positions, the second image acquiring range, and the second focus measuring positions by referring to the macro image.

8. The information record medium having an image acquiring program according to claim 6, wherein when a partial image among the plurality of partial images includes a first region belonging to the first image acquiring range and does not include a second region belonging to the second image acquiring range, the focus information is set as the first focus information to perform scanning of the sample for acquiring the partial image.

9. The information record medium having an image acquiring program according to claim 6, wherein the first focus information is a focal plane or a two-dimensional focus map applied to the first image acquiring range, and the second focus information is a focal plane or a two-dimensional focus map different from the first focus information and applied to the second image acquiring range.

10. The information record medium having an image acquiring program according to claim 6, wherein, in setting the first image acquiring range and the second image acquiring range by the image pickup condition setting processing, the image of the sample is binarized, the dilation processing for enlarging the mass of a picture is applied to the binarized image of the sample including the image of the first object and the image of the second object, and the first image acquiring range and the second image acquiring range are set by using the boundary between the first object and the second object, formed when dilating the first object and the second object respectively to the largest sizes, as the dividing line.

* * * * *

UNITED STATES PATENT AND TRADEMARK OFFICE
CERTIFICATE OF CORRECTION

PATENT NO. : 7,801,352 B2  Page 1 of 1
APPLICATION NO. : 11/477822
DATED : September 21, 2010
INVENTOR(S) : Shigeru Uchiyama et al.

It is certified that error appears in the above-identified patent and that said Letters Patent is hereby corrected as shown below:

Title Page, Item (73) "Assignee"

change "Kamamatsu-shi" to --Hamamatsu-shi--

Signed and Sealed this

Thirtieth Day of November, 2010

David J. Kappos
*Director of the United States Patent and Trademark Office*